US012763016B2

(12) United States Patent
Li et al.

(10) Patent No.: US 12,763,016 B2
(45) Date of Patent: Oct. 13, 2026

(54) PIXEL CIRCUIT, PIXEL DRIVING METHOD AND DISPLAY DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Jian Li, Beijing (CN); Xuesong Tian, Beijing (CN); Shuai Hou, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 217 days.

(21) Appl. No.: 18/556,897

(22) PCT Filed: Jan. 19, 2023

(86) PCT No.: PCT/CN2023/073062

§ 371 (c)(1),
(2) Date: Oct. 24, 2023

(87) PCT Pub. No.: WO2024/152283

PCT Pub. Date: Jul. 25, 2024

(65) Prior Publication Data

US 2026/0120632 A1 Apr. 30, 2026

(51) Int. Cl.
*G09G 3/3233* (2016.01)

(52) U.S. Cl.
CPC ..... *G09G 3/3233* (2013.01); *G09G 2300/043* (2013.01); *G09G 2300/0819* (2013.01); *G09G 2300/0852* (2013.01); *G09G 2310/0245* (2013.01); *G09G 2310/08* (2013.01); *G09G 2320/0233* (2013.01)

(58) Field of Classification Search
None
See application file for complete search history.

(56) References Cited

U.S. PATENT DOCUMENTS

| | | | | |
|---|---|---|---|---|
| 2018/0308412 A1* | 10/2018 | Wu | .................... | H10K 59/1213 |
| 2019/0371238 A1* | 12/2019 | Gao | .................... | H10K 59/131 |
| 2020/0273411 A1 | 8/2020 | Gao et al. | | |
| 2021/0110769 A1* | 4/2021 | Ueno | .................... | G09G 3/3275 |
| 2021/0193049 A1 | 6/2021 | Lin et al. | | |

(Continued)

FOREIGN PATENT DOCUMENTS

| | | |
|---|---|---|
| CN | 106409233 A | 2/2017 |
| CN | 107358918 A | 11/2017 |

(Continued)

*Primary Examiner* — Matthew Yeung
(74) *Attorney, Agent, or Firm* — BROOKS KUSHMAN P.C.

(57) ABSTRACT

A pixel circuit includes a driving circuit, a first initialization circuit and a second initialization circuit, the driving circuit is configured to generate a current flowing from a second node to a third node under control of a potential at the first node, the first initialization circuit writes a first initial voltage into a first node under control of a first control signal, and the second initialization circuit writes a second initial voltage to the third node under control of a first scanning signal.

19 Claims, 12 Drawing Sheets

(56) References Cited

U.S. PATENT DOCUMENTS

| | | | | |
|---|---|---|---|---|
| 2021/0287605 | A1* | 9/2021 | Wang | G09G 3/3233 |
| 2021/0295784 | A1* | 9/2021 | Kim | G09G 3/3291 |
| 2021/0383752 | A1 | 12/2021 | Yang et al. | |
| 2021/0407401 | A1* | 12/2021 | Chen | G09G 3/3233 |
| 2022/0028338 | A1 | 1/2022 | Yang et al. | |
| 2022/0343852 | A1 | 10/2022 | Wang et al. | |
| 2023/0140902 | A1* | 5/2023 | Park | G09G 3/3266 |

FOREIGN PATENT DOCUMENTS

| | | | |
|---|---|---|---|
| CN | 109599062 | A | 4/2019 |
| CN | 109817165 | A | 5/2019 |
| CN | 110660360 | A | 1/2020 |
| CN | 111508426 | A | 8/2020 |
| CN | 112382235 | A | 2/2021 |
| CN | 113593475 | A | 11/2021 |
| CN | 114627807 | A | 6/2022 |
| CN | 114974130 | A | 8/2022 |
| CN | 115023756 | A | 9/2022 |
| CN | 115244609 | A | 10/2022 |
| CN | 115273737 | A | 11/2022 |
| CN | 115482780 | A | 12/2022 |
| CN | 115547255 | A | 12/2022 |
| TW | 202221689 | A | 6/2022 |

* cited by examiner

PIXEL CIRCUIT, PIXEL DRIVING METHOD AND DISPLAY DEVICE

CROSS-REFERENCE TO RELATED APPLICATION

This application is the U.S. national phase of PCT Application No. PCT/CN2023/073062 filed on Jan. 19, 2023, which is incorporated herein by reference in its entirety.

TECHNICAL FIELD

The present disclosure relates to the field of display technologies, in particular to a pixel circuit, a pixel driving method and a display device.

BACKGROUND

In the related art, a variable refresh rate (VRR) represents that there is a difference in brightness and chromaticity coordinates before and after frequency switching. During switching of a display frequency, since there is a difference in a threshold voltage of a driving transistor in a pixel circuit, a brightness difference occurs, which is easily captured by human eyes.

SUMMARY

In an aspect, an embodiment of the present disclosure provides a pixel circuit, including a driving circuit, a first initialization circuit and a second initialization circuit;

a control end of the driving circuit is electrically connected to a first node, a first end of the driving circuit is electrically connected to a second node, and a second end of the driving circuit is electrically connected to a third node, and the driving circuit is configured to generate a current flowing from the second node to the third node under control of a potential at the first node;

the first initialization circuit is electrically connected to a first control end, a first initial voltage line and the first node, and configured to write a first initial voltage from the first initial voltage line into the first node under control of a first control signal from the first control end;

the second initialization circuit is electrically connected to a first scanning end, a second initial voltage line and the third node, and configured to write a second initial voltage from the second initial voltage line into the third node under control of a first scanning signal from the first scanning end.

Optionally, the driving circuit includes a driving transistor which is a p-type transistor, and a difference between a voltage value of the first initial voltage and a voltage value of the second initial voltage is less than a threshold voltage of the driving transistor; or, the driving circuit includes a driving transistor which is an n-type transistor, and a difference between a voltage value of the first initial voltage and a voltage value of the second initial voltage is greater than a threshold voltage of the driving transistor.

Optionally, in at least one embodiment of the present disclosure, the pixel circuit further includes a data written-in circuit, a compensation control circuit and an energy storage circuit;

the data written-in circuit is electrically connected to a second scanning end, a data line and the second node, and configured to write a data voltage on the data line into the second node under control of a second scanning signal from the second scanning end;

the compensation control circuit is electrically connected to a second control end, the first node and the third node, and configured to control the first node to be electrically connected to, or electrically disconnected from, the third node under control of a second control signal from the second control end;

a first end of the energy storage circuit is electrically connected to the first node, a second end of the energy storage circuit is electrically connected to a first voltage end, and the energy storage circuit is configured to store electric energy.

Optionally, in at least one embodiment of the present disclosure, the pixel circuit further includes a data written-in circuit and an energy storage circuit;

the data written-in circuit is electrically connected to a second scanning end, a data line and the first node, and configured to write a data voltage on the data line into the first node under control of a second scanning signal from the second scanning end;

a first end of the energy storage circuit is electrically connected to the first node, a second end of the energy storage circuit is electrically connected to a first voltage end, and the energy storage circuit is configured to store electric energy.

Optionally, in at least one embodiment of the present disclosure, the pixel circuit further includes a first energy storage circuit, a second energy storage circuit, a data written-in circuit and a compensation control circuit;

a first end of the first energy storage circuit is electrically connected to the first node, a second end of the first energy storage circuit is electrically connected to a first end of the second energy storage circuit, and a second end of the second energy storage circuit is electrically connected to a first voltage end; the first energy storage circuit and the second energy storage circuit are configured to store electric energy;

the data written-in circuit is electrically connected to a second scanning end, a data line and the second end of the first energy storage circuit, and configured to write a data voltage on the data line into the second end of the first energy storage circuit under control of a second scanning signal from the second scanning end;

the compensation control circuit is electrically connected to a second control end, the first node and the third node, and configured to control the first node to be electrically connected to, or electrically disconnected from, the third node under control of a second control signal from the second control end.

Optionally, the compensation control circuit includes a first transistor, a gate electrode of the first transistor is electrically connected to the second control end, a first electrode of the first transistor is electrically connected to the first node, and a second electrode of the first transistor is electrically connected to the third node; the first transistor is a double-gate transistor.

Optionally, the compensation control circuit includes a first compensation control transistor and a second compensation control transistor; a gate electrode of the first compensation control transistor is electrically connected to the second control end, a first electrode of the first compensation control transistor is electrically connected to the first node, and a second electrode of the first compensation control transistor is electrically connected to an intermediate node; a gate electrode of the second compensation control transistor is electrically connected to the second control end, a first electrode of the second compensation control transistor is electrically connected to the intermediate node, and a second electrode of the second compensation control transistor is electrically connected to the third node; the pixel circuit further includes a third initialization circuit;

the third initialization circuit is electrically connected to a light-emission control end, a third initial voltage line and the intermediate node, and configured to write a third initial voltage from the third initial voltage line into the intermediate node under control of a light-emission control signal from the light-emission control end.

Optionally, in at least one embodiment of the present disclosure, the pixel circuit further includes a light-emitting element, a first light-emission control circuit and a second light-emission control circuit;

the first light-emission control circuit is electrically connected to a first light-emission control end, a power source voltage end and the first end of the driving circuit, and configured to control the power source voltage end to be electrically connected to, or electrically disconnected from, the first end of the driving circuit under control of a first light-emission control signal from the first light-emission control end;

the second light-emission control circuit is electrically connected to a second light-emission control end, the second end of the driving circuit and a first electrode of the light-emitting element, and configured to control the second end of the driving circuit to be electrically connected to, or electrically disconnected from, the first electrode of the light-emitting element under control of a second light-emission control signal from the second light-emission control end;

a second electrode of the light-emitting element is electrically connected to a second voltage terminal.

Optionally, in at least one embodiment of the present disclosure, the pixel circuit further includes a fourth initialization circuit;

the fourth initialization circuit is electrically connected to the first scanning end, a fourth initial voltage line and the first electrode of the light-emitting element, and configured to write a fourth initial voltage from the fourth initial voltage line into the first electrode of the light-emitting element under control of the first scanning signal from the first scanning end.

Optionally, the driving circuit includes a driving transistor, the first initialization circuit includes a second transistor, and the second initialization circuit includes a third transistor;

a gate electrode of the driving transistor is electrically connected to the first node, a first electrode of the driving transistor is electrically connected to the second node, and a second electrode of the driving transistor is electrically connected to the third node;

a gate electrode of the second transistor is electrically connected to the first control end, a first electrode of the second transistor is electrically connected to the first initial voltage line, and a second electrode of the second transistor is electrically connected to the first node;

a gate electrode of the third transistor is electrically connected to the first scanning end, a first electrode of the third transistor is electrically connected to the second initial voltage line, and a second electrode of the third transistor is electrically connected to the third node.

Optionally, the data written-in circuit includes a fourth transistor;

a gate electrode of the fourth transistor is electrically connected to the second scanning end, a first electrode of the fourth transistor is electrically connected to the data line, and a second electrode of the fourth transistor is electrically connected to the second node;

the energy storage circuit includes a storage capacitor;

a first end of the storage capacitor is electrically connected to the first node, and a second end of the storage capacitor is electrically connected to a power source voltage end.

Optionally, the data written-in circuit includes a fourth transistor;

a gate electrode of the fourth transistor is electrically connected to the second scanning end, a first electrode of the fourth transistor is electrically connected to the data line, and a second electrode of the fourth transistor is electrically connected to the first node;

the energy storage circuit includes a storage capacitor;

a first end of the storage capacitor is electrically connected to the first node, and a second end of the storage capacitor is electrically connected to the first voltage end.

Optionally, the data written-in circuit includes a fourth transistor;

a gate electrode of the fourth transistor is electrically connected to the second scanning end, a first electrode of the fourth transistor is electrically connected to the data line, and a second electrode of the fourth transistor is electrically connected to the second end of the first energy storage circuit;

the first energy storage circuit includes a first storage capacitor, and the second energy storage circuit includes a second storage capacitor;

a first end of the first storage capacitor is electrically connected to the first node, a second end of the first storage capacitor is electrically connected to a first end of the second storage capacitor, and a second end of the second storage capacitor is electrically connected to the first voltage end.

Optionally, the first light-emission control circuit includes a fifth transistor, and the second light-emission control circuit includes a sixth transistor;

a gate electrode of the fifth transistor is electrically connected to the first light-emission control end, a first electrode of the fifth transistor is electrically connected to the power source voltage end, and a second electrode of the fifth transistor is electrically connected to the first end of the driving circuit;

a gate electrode of the sixth transistor is electrically connected to the second light-emission control end, a first electrode of the sixth transistor is electrically connected to the second end of the driving circuit, and a second electrode of the sixth transistor is electrically connected to the first electrode of the light-emitting element.

Optionally, the fourth initialization circuit includes a seventh transistor;

a gate electrode of the seventh transistor is electrically connected to the first scanning end, a first electrode of the seventh transistor is electrically connected to the fourth initial voltage line, and a second electrode of the seventh transistor is electrically connected to the first electrode of the light-emitting element.

Optionally, the third initialization circuit includes an eighth transistor;

a gate electrode of the eighth transistor is electrically connected to the light-emission control end, a first electrode of the eighth transistor is electrically connected to the third initial voltage line, and a second electrode of the eighth transistor is electrically connected to the intermediate node.

In a third aspect, an embodiment of the present disclosure provides a pixel driving method, applied to the above-mentioned pixel circuit, a display period including a maintaining frame, the maintaining frame including a maintaining bias stage; the pixel driving method includes:

at the maintaining bias stage, writing, by the first initialization circuit, a first initial voltage into the first node under control of a first control signal; writing, by the second initialization circuit, a second initial voltage to the third node under control of a first scanning signal, to enable a driving transistor of the driving circuit to be in an on-bias state.

Optionally, the pixel circuit further includes a first light-emission control circuit, a second light-emission control circuit and a light-emitting element;

the maintaining bias stage includes a plurality of maintaining bias time periods; the maintaining frame further includes a plurality of maintaining light-emitting time periods; the maintaining bias time periods and the maintaining light-emitting time periods are arranged alternately, and the pixel driving method includes:

in the maintaining bias time period, writing, by the first initialization circuit, the first initial voltage into the first node under control of the first control signal; writing, by the second initialization circuit, the second initial voltage into the third node under control of the first scanning signal, to enable the driving transistor of the driving circuit to be in the on-bias state;

in the maintaining light-emitting time period, controlling, by the first light-emission control circuit, a power source voltage end to be electrically connected to the first end of the driving circuit under control of a first light-emission control signal, controlling, by the second light-emission control circuit, the second end of the driving circuit to be electrically connected to a first electrode of the light-emitting element under control of a second light-emission control signal, and driving, by the driving circuit, the light-emitting element.

Optionally, the display period further includes a refresh frame arranged between maintaining frames; the refresh frame includes a pre-written-in bias stage arranged before a data written-in stage; the pixel driving method includes:

at the pre-written-in bias stage, writing, by the first initialization circuit, the first initial voltage into the first node under control of the first control signal; writing, by the second initialization circuit, the second initial voltage to the third node under control of the first scanning signal, to enable the driving transistor of the driving circuit to be in the on-bias state.

Optionally, the display period further includes a refresh frame arranged between maintaining frames; the refresh frame further includes a post-written-in bias stage arranged after the data written-in stage; the pixel driving method includes:

at the post-written-in bias stage, writing, by the first initialization circuit, the first initial voltage into the first node under control of the first control signal; writing, by the second initialization circuit, the second initial voltage into the third node under control of the first scanning signal, to enable the driving transistor of the driving circuit to be in the on-bias state.

Optionally, the pixel circuit includes a data written-in circuit; the pixel driving method further includes:

at the data written-in stage, writing, by the data written-in circuit, a data voltage on a data line to the second node under control of a second scanning signal from the second scanning end.

Optionally, the pixel circuit further includes a compensation control circuit; the refresh frame further includes a compensation stage; the data written-in stage is in the compensation stage, the data written-in stage is arranged before the post-written-in bias stage; the pixel driving method includes:

at the compensation stage, controlling, by the compensation control circuit, the first node to be electrically connected to the third node under control of a second control signal from a second control end.

Optionally, the pixel circuit further includes a light-emitting element, a first light-emission control circuit and a second light-emission control circuit; the refresh frame further includes a refresh light-emitting stage arranged after the post-written-in bias stage; the maintaining frame includes a maintaining light-emitting stage;

the pixel driving method further includes:

at the refresh light-emitting stage and the maintaining light-emitting stage, controlling, by the first light-emission control circuit, a power source voltage end to be electrically connected to the first end of the driving circuit under control of a first light-emission control signal, controlling, by the second light-emission control circuit, the second end of the driving circuit to be electrically connected to a first electrode of the light-emitting element under control of a second light-emission control signal, and driving, by the driving circuit, the light-emitting element.

Optionally, the pixel circuit further includes a light-emitting element, a first light-emission control circuit and a second light-emission control circuit; the refresh frame further includes a refresh light-emitting stage;

the post-written-in bias stage includes a plurality of refresh bias time periods, and the refresh light-emitting stage includes a plurality of refresh light-emitting time periods; the refresh bias time periods and the refresh light-emitting time periods are arranged alternately;

the pixel driving method includes:

in the refresh bias time period, writing, by the first initialization circuit, the first initial voltage into the first node under control of the first control signal; writing, by the second initialization circuit, the second initial voltage into the third node under control of the first scanning signal, to enable the driving transistor of the driving circuit to be in the on-bias state;

in the refresh light-emitting time period, controlling, by the first light-emission control circuit, a power source voltage end to be electrically connected to the first end of the driving circuit under control of a first light-emission control signal, controlling, by the second light-emission control circuit, the second end of the driving circuit to be electrically connected to a first electrode of the light-emitting element under control of a second light-emission control signal, and driving, by the driving circuit, the light-emitting element.

Optionally, the compensation control circuit includes a first compensation control transistor and a second compensation control transistor, and the pixel circuit further includes a third initialization circuit; the pixel driving method further includes:

at the refresh light-emitting stage and the maintaining light-emitting stage, writing, by the third initialization circuit, a third initial voltage into an intermediate node under control of a light-emission control signal.

In a third aspect, an embodiment of the present disclosure provides a display device including the above-mentioned pixel circuit.

DETAILED DESCRIPTION

The technical solutions in the embodiments of the present disclosure will be described hereinafter clearly and completely with reference to the drawings of the embodiments of the present disclosure. Apparently, the following embodiments merely relate to a part of, rather than all of, the embodiments of the present disclosure, and based on these embodiments, a person of ordinary skill in the art may, without any creative effort, obtain other embodiments, which also fall within the scope of the present disclosure.

In the embodiments of the present disclosure, each transistor maybe a thin film transistor (TFT), a field effect transistor (FET), or any other element having a same characteristic. In order to differentiate two electrodes of the transistor, apart from a gate electrode, from each other, one of the two electrodes may be called as a first electrode, and the other may be called as a second electrode.

In actual use, when the transistor is a TFT or FET, the first electrode may be a drain electrode and the second electrode may be a source electrode, or the first electrode may be a source electrode and the second electrode may be a drain electrode.

Figure 1:
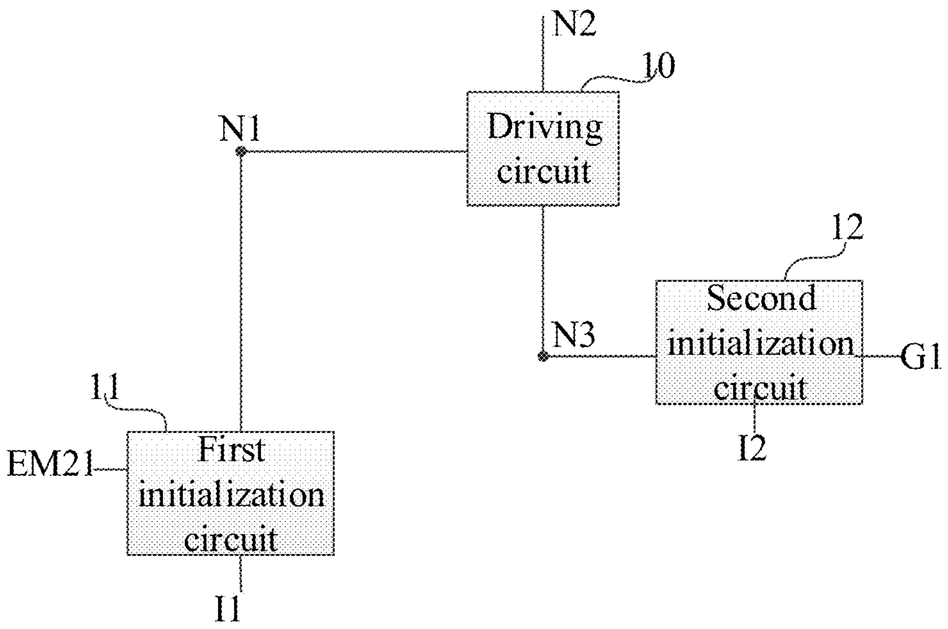
FIG. 1 is a schematic view showing a pixel circuit according to at least one embodiment of the present disclosure.

As shown in FIG. 1, a pixel circuit according to at least one embodiment of the present disclosure includes a driving circuit 10, a first initialization circuit 11 and a second initialization circuit 12;

a control end of the driving circuit 10 is electrically connected to a first node N1, a first end of the driving circuit 10 is electrically connected to a second node N2, and a second end of the driving circuit 10 is electrically connected to a third node N3, and the driving circuit 10 is configured to generate a current flowing from the second node N2 to the third node N3 under control of a potential at the first node N1;

the first initialization circuit 11 is electrically connected to a first control end EM21, a first initial voltage line I1 and the first node N1, and configured to write a first initial voltage Vinit1 from the first initial voltage line I1 into the first node N1 under control of a first control signal from the first control end EM21;

the second initialization circuit 12 is electrically connected to a first scanning end G1, a second initial voltage line I2 and the third node N3, and configured to write a second initial voltage Vinit2 from the second initial voltage line I2 into the third node N3 under control of a first scanning signal from the first scanning end G1.

In the pixel circuit shown in FIG. 1 of the present disclosure, the first initialization circuit 11 and the second initialization circuit 12 are provided, the first initialization circuit 11 writes the first initial voltage Vinit1 into the first node N1 under control of the first control signal, the second initialization circuit 12 writes the second initial voltage Vinit2 into the third node N3 under control of the first scanning signal, so as to control the driving transistor of the driving circuit 10 to be in an on-bias state.

In at least one embodiment of the present disclosure, when the potential at the first node N1 is Vinit1 and a potential at the third node N3 is Vinit2, it is able to enable a transistor included in the driving circuit 10 to be in an on-bias state.

During the operation of the pixel circuit shown in FIG. 1 of the present disclosure, a display period may include a maintaining frame, the maintaining frame may include a maintaining bias stage arranged before a maintaining light-emitting stage;

the first initialization circuit 11 writes the first initial voltage Vinit1 into the first node N1 under control of the a first control signal at the maintaining bias stage; the second initialization circuit 12 writes the second initial voltage Vinit2 into the third node N3 under control of the first scanning signal, so that the driving transistor of the driving circuit 10 is in an on-bias state to pull down Vth.

During the operation of the pixel circuit in FIG. 1, the driving transistor is controlled in an on-bias state during the maintaining bias stage included in the maintaining frame, so as to pull down Vth, thereby to mitigate variable refresh rate (VRR) issues.

In the related art, a variable refresh rate (VRR) represents that there is a difference in brightness and chromaticity coordinates before and after frequency switching. Taking a case where a display frequency is switched from 120 Hz to 30 Hz as an example, when the display frequency is 120 Hz, each frame is refreshed, and when the display frequency is 30 Hz, one frame is refreshed with three frames maintained. In a refresh frame, Vth is negatively biased, and in the maintaining frame, Vth restores to be stable. When the display frequency is 120 Hz, Vth is negatively biased in each frame; when the display frequency is 30 Hz, Vth is negatively biased in the refresh frame and Vth is restored in the maintaining frame. Therefore, during switching of the display frequency, since there is a difference in Vth, a brightness difference occurs, which is easily captured by human eyes. Based on this, at least one embodiment of the present disclosure, the driving transistor is controlled to be in the on-bias state to pull down the Vth during the maintaining bias stage prior to the maintaining light-emitting stage in the maintaining frame, so as to reduce the difference in Vth between the refresh frame and the maintaining frame, thereby to mitigate the VRR.

In at least one embodiment of the present disclosure, an absolute value of the difference between the Vth of the refresh frame and the Vth of the maintaining frame may be, but not limited to, less than or equal to 0.2 V. In a specific implementation, the absolute value of the difference may be selected according to practical applications.

Optionally, a voltage value of Vinit1 may be, but not limited to, greater than or equal to −5V and less than or equal to −3V, and a voltage value of Vinit2 may be, but not limited to, greater than or equal to 5V and less than or equal to 7V.

During the implementation, taking a case where TO is a p-type transistor as an example, in each bias stage, Vinit1 is written into the first node N1, Vinit3 is written into the third node N3, T0 is turned on, and Vinit2 is written into the second node N2. A gate-source voltage Vgs of T0 is less than the threshold voltage Vth of T0, and an absolute value of the gate-source voltage Vgs of T0 is relatively large, so that more holes are captured at a switch of T0, thereby the Vth is negatively biased.

During the operation of the pixel circuit shown in FIG. 1 of the present disclosure, the display period includes a refresh frame including a pre-written-in bias stage arranged before a data written-in stage;

the first initialization circuit writes the first initial voltage into the first node under control of the first control signal at the pre-written-in bias stage; the second initialization circuit writes the second initial voltage to the third node under control of the first scanning signal, so that the driving transistor of the driving circuit is in the on-bias state.

During the operation of the pixel circuit in FIG. 1, in the refresh frame and before data written-in and charging, the driving transistor of the driving circuit is controlled to be in the on-bias state, so as to pull down the threshold voltage Vth of the driving transistor without being adversely affected by a data voltage of a previous frame, thereby to address first frame rate (FFR) issues.

In the related art, it has been found through mechanism analysis that FFR has a strong relationship with the threshold voltage of the driving transistor. When a black image is displayed, a voltage value of the data voltage Vdata is greater, and a negative bias of the threshold voltage Vth is greater. When a white image is displayed, a voltage value of the data voltage Vdata is smaller, and a negative bias of the threshold voltage Vth is smaller. Due to the Vth difference, when the black image is switched to the white image, the Vth is still in a black image state, and it requires the data voltage of the white image to compensating part of the Vth first, so that the brightness of a first frame in a switched image is low. Therefore, in at least one embodiment of the present disclosure, in the refresh frame, and before charging through the data voltage, the Vth is pulled down by controlling the driving transistor to be in an on-bias state, so as to address the FFR issues.

In the related art, low frequency technology has been widely applied to small and medium display panels, but most of them are OLED (organic light emitting diode) display panels using LTPO (low temperature polycrystalline oxide) materials. LTPO panels are expensive due to their complex technology. For this reason, many panel manufacturers pursue LTPS (Low Temperature Poly-Silicon) low frequency displays, and also pursue higher frequency displays compatible with low frequency displays, high frequencies such as 144 Hz or 165 Hz, and low frequencies such as 40 Hz or 30 Hz. In the conventional pixel circuit, FFR at high frequencies is not good and VRR at low frequencies is not good.

In the pixel circuit according to at least one embodiment of the present disclosure, it is able to mitigate VRR and FFR, and realize both high frequency display and low frequency display.

Optionally, the driving circuit includes a driving transistor which is a p-type transistor, and a difference between a voltage value of the first initial voltage and a voltage value of the second initial voltage is less than a threshold voltage of the driving transistor; or, the driving circuit includes a driving transistor which is an n-type transistor, and a difference between a voltage value of the first initial voltage and a voltage value of the second initial voltage is greater than a threshold voltage of the driving transistor.

During the implementation, it is able to control the driving transistor to be in an on-bias state by setting the voltage value of the first initial voltage and the voltage value of the second initial voltage.

According to at least one embodiment of the present disclosure, the pixel circuit further includes a data written-in circuit, a compensation control circuit and an energy storage circuit.

The data written-in circuit is electrically connected to a second scanning end, a data line and the second node, and configured to write a data voltage on the data line into the second node under control of a second scanning signal from the second scanning end.

The compensation control circuit is electrically connected to a second control end, the first node and the third node, and configured to control the first node to be electrically connected to, or electrically disconnected from, the third node under control of a second control signal from the second control end.

A first end of the energy storage circuit is electrically connected to the first node, a second end of the energy storage circuit is electrically connected to a first voltage end, and the energy storage circuit is configured to store electric energy.

During the implementation, the pixel circuit may further include the data written-in circuit and the compensation control circuit, the data written-in circuit writes the data voltage into the second node under control of the second scanning signal, and the compensation control circuit controls the first node to be electrically connected to, or electrically disconnected from, the second node to perform threshold voltage compensation under control of the second control signal.

Optionally, the first voltage end may be a power source voltage end or a reference voltage end. In actual use, the first voltage end may be, but not limited to, a direct current voltage end.

Figure 2:
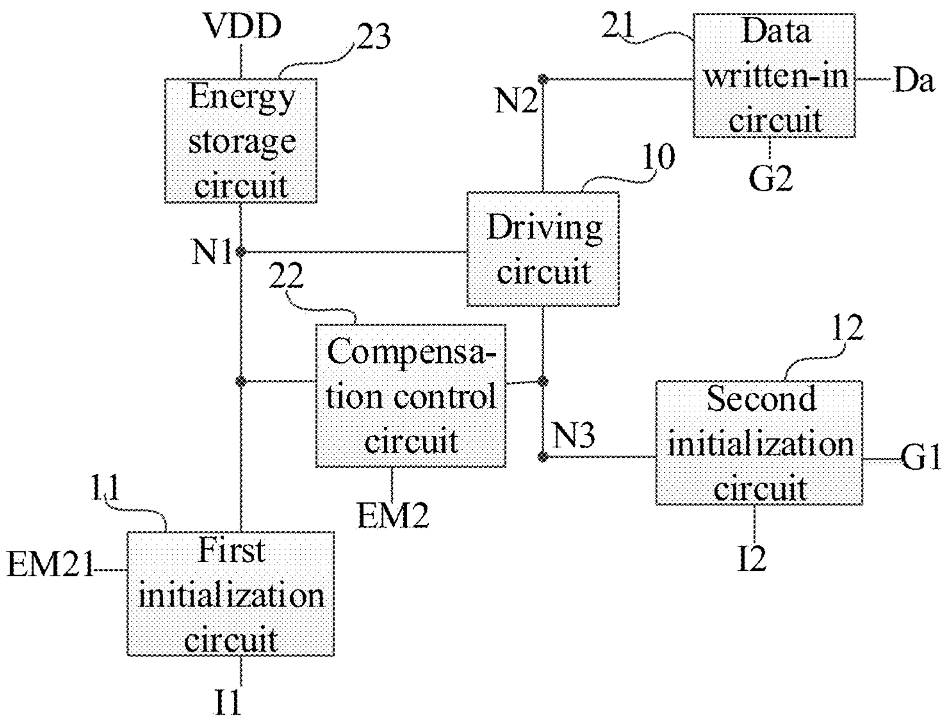
FIG. 2 is a schematic view showing a pixel circuit according to at least one embodiment of the present disclosure.

As shown in FIG. 2, on the basis of the pixel circuit in FIG. 1, the pixel circuit further includes a data written-in circuit 21, a compensation control circuit 22 and an energy storage circuit 23.

The data written-in circuit 21 is electrically connected to a second scanning end G2, a data line Da and the second node N2, and configured to write a data voltage Vdata on the data line Da into the second node N2 under control of a second scanning signal from the second scanning end G2.

The compensation control circuit 22 is electrically connected to a second control end EM2, the first node N1 and the third node N3, and configured to control the first node N1 to be electrically connected to, or electrically disconnected from, the third node N3 under control of a second control signal from the second control end EM2.

A first end of the energy storage circuit 23 is electrically connected to the first node N1, a second end of the energy storage circuit 23 is electrically connected to a power source voltage end VDD, and the energy storage circuit 23 is configured to store electric energy.

During the operation of the driving circuit in FIG. 2, the refresh frame further includes a compensation stage, the data written-in stage is included in the compensation stage, and the data written-in stage is arranged before the post-written-in bias stage.

At the data written-in stage, the data written-in circuit 21 writes the data voltage Vdata on the data line Da into the second node N2 under control of the second scanning signal from the second scanning end G2.

At the compensation stage, the compensation control circuit 22 controls the first node N1 to be electrically connected to the third node N3 under control of the second control signal from the second control end EM2.

Figure 3:
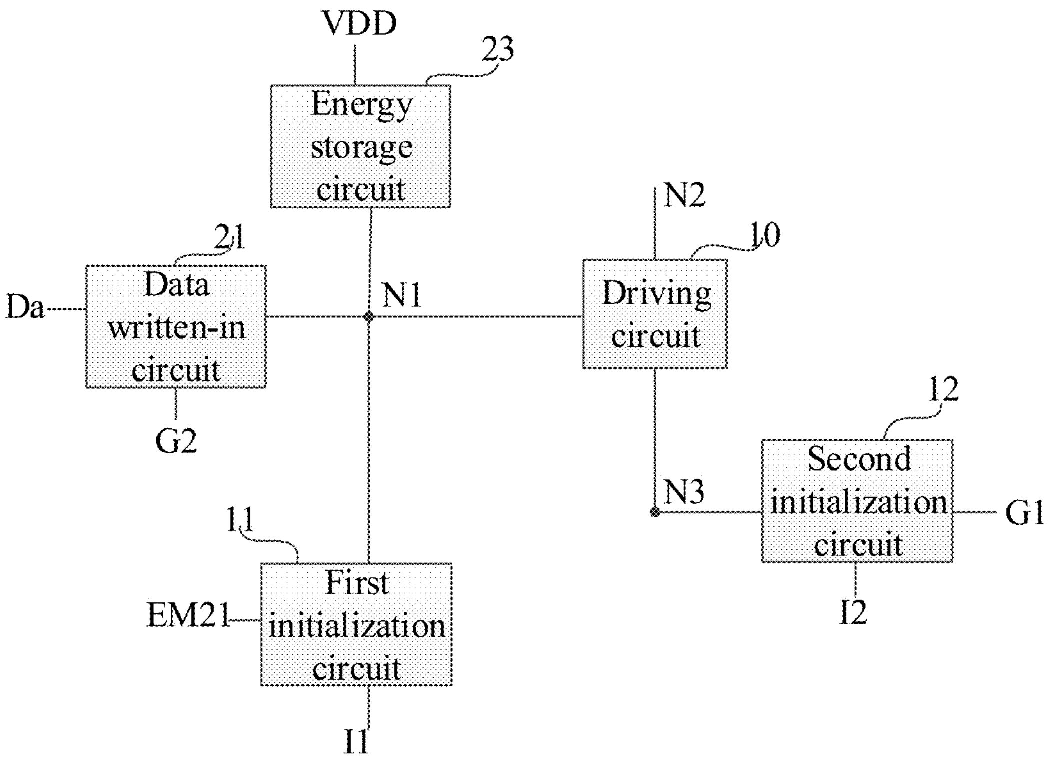
FIG. 3 is a schematic view showing a pixel circuit according to at least one embodiment of the present disclosure.

As shown in FIG. 3, on the basis of the pixel circuit in FIG. 1, the pixel circuit may further include a data written-in circuit 21 and an energy storage circuit 23.

The data written-in circuit 21 is electrically connected to a second scanning end G2, a data line Da and the first node N1, and configured to write a data voltage Vdata on the data line Da into the first node N1 under control of a second scanning signal from the second scanning end G2.

A first end of the energy storage circuit 23 is electrically connected to the first node N1, a second end of the energy storage circuit 23 is electrically connected to a power source voltage end VDD, and the energy storage circuit 23 is configured to store electric energy.

During the operation of the pixel circuit in FIG. 3, at the data written-in stage, the data written-in circuit 21 writes the data voltage Vdata on the data line Da into the first node N1 under control of the second scanning signal for data voltage written-in.

Figure 4:
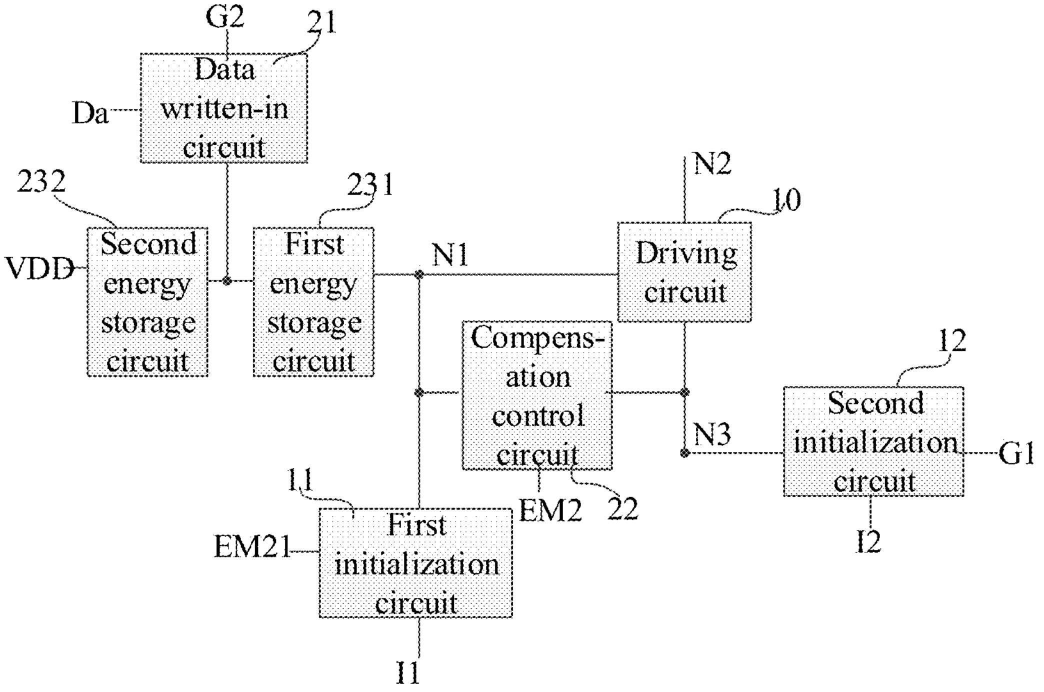
FIG. 4 is a schematic view showing a pixel circuit according to at least one embodiment of the present disclosure.

According to at least one embodiment of the present disclosure, as shown in FIG. 4, on the basis of the pixel circuit in FIG. 1, the pixel circuit may further include a first energy storage circuit 231, a second energy storage circuit 232, a data written-in circuit 21 and a compensation control circuit 22.

A first end of the first energy storage circuit 231 is electrically connected to the first node N1, a second end of the first energy storage circuit 231 is electrically connected to a first end of the second energy storage circuit 232, and a second end of the second energy storage circuit 232 is electrically connected to a power source voltage end VDD. The first energy storage circuit 231 and the second energy storage circuit 232 are configured to store electric energy.

The data written-in circuit 21 is electrically connected to a second scanning end G2, a data line Da and the second end of the first energy storage circuit 231, and configured to write a data voltage Vdata on the data line Da into the second end of the first energy storage circuit 231 under control of a second scanning signal from the second scanning end G2.

The compensation control circuit 22 is electrically connected to a second control end EM2, the first node N1 and the third node N3, and configured to control the first node N1 to be electrically connected to, or electrically disconnected from, the third node N3 under control of a second control signal from the second control end EM2.

Optionally, the compensation control circuit includes a first transistor, the first transistor is a double-gate transistor, a gate electrode of the first transistor is electrically connected to the second control end, a first electrode of the first transistor is electrically connected to the first node, and a second electrode of the first transistor is electrically connected to the third node.

In at least one embodiment of the present disclosure, the compensation control circuit includes the first transistor that may be a double-gate transistor having a smaller leakage current, so as to maintain the potential at the first node in a better manner.

In at least one embodiment of the present disclosure, the compensation control circuit includes a first compensation control transistor and a second compensation control transistor. A gate electrode of the first compensation control transistor is electrically connected to the second control end, a first electrode of the first compensation control transistor is electrically connected to the first node, and a second electrode of the first compensation control transistor is electrically connected to an intermediate node. A gate electrode of the second compensation control transistor is electrically connected to the second control end, a first electrode of the second compensation control transistor is electrically connected to the intermediate node, and a second electrode of the second compensation control transistor is electrically connected to the third node. The pixel circuit further includes a third initialization circuit.

The third initialization circuit is electrically connected to a light-emission control end, a third initial voltage line and an intermediate node of the first transistor, and configured to write a third initial voltage from the third initial voltage line into the intermediate node under control of a light-emission control signal from the light-emission control end.

During the implementation, the compensation control circuit may include the first compensation control transistor and the second compensation control transistor, and the pixel circuit may further include the third initialization circuit, the third initialization circuit writing the third initial voltage into the intermediate node under control of the light-emission control signal, so as to write the third initial voltage into the intermediate node during the light-emitting stage, so as to reduce the leakage current of the first node N1, thereby facilitating the maintenance of the potential at the first node N1.

Figure 5:
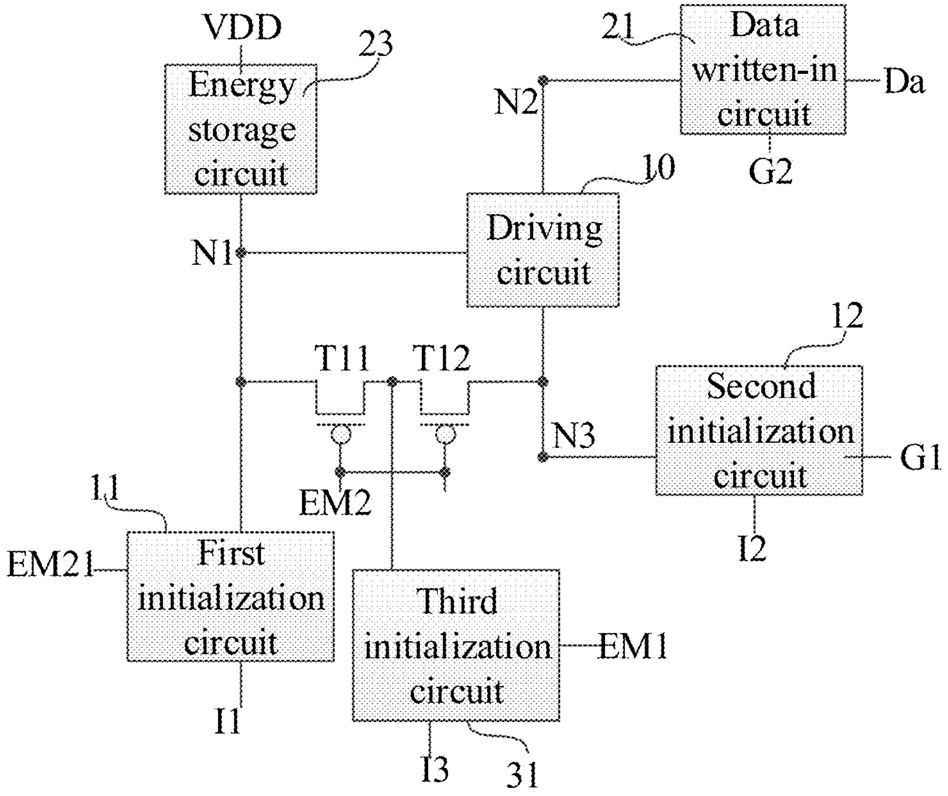
FIG. 5 is a schematic view showing a pixel circuit according to at least one embodiment of the present disclosure.

As shown in FIG. 5, on the basis of the pixel circuit in FIG. 2, the compensation control circuit includes a first compensation control transistor T11 and a second compensation control transistor T12, and the pixel circuit further includes a third initialization circuit 31.

A gate electrode of the first compensation control transistor T11 is electrically connected to the second control end EM2, a source electrode of the first compensation control transistor T11 is electrically connected to the first node N1, and a drain electrode of the first compensation control transistor T11 is electrically connected to an intermediate node.

A gate electrode of the second compensation control transistor T12 is electrically connected to the second control end EM2, a source electrode of the second compensation control transistor T12 is electrically connected to the intermediate node, and a drain electrode of the second compensation control transistor T12 is electrically connected to the third node N3.

The third initialization circuit 31 is electrically connected to a light-emission control end EM1, a third initial voltage line I3 and the intermediate node, and configured to write a third initial voltage Vinit3 from the third initial voltage line I3 into the intermediate node under control of a light-emission control signal from the light-emission control end EM1.

During the operation of the pixel circuit in FIG. 5, the third initialization circuit 31 writes the third initial voltage Vinit3 into the intermediate node under control of the light-emission control signal during the refresh light-emitting stage and the maintaining light-emitting stage, where the voltage value of the third initial voltage Vinit3 is not much different from the potential at the first node N1, so as to reduce the leakage of the first node N1 and facilitate the maintenance of the potential at the first node N1.

According to at least one embodiment of the present disclosure, the pixel circuit further includes a light-emitting element, a first light-emission control circuit and a second light-emission control circuit.

The first light-emission control circuit is electrically connected to a first light-emission control end, a power source voltage end and the first end of the driving circuit, and configured to control the power source voltage end to be electrically connected to, or electrically disconnected from, the first end of the driving circuit under control of a first light-emission control signal from the first light-emission control end.

The second light-emission control circuit is electrically connected to a second light-emission control end, the second end of the driving circuit and a first electrode of the light-emitting element, and configured to control the second end of the driving circuit to be electrically connected to, or electrically disconnected from, the first electrode of the light-emitting element under control of a second light-emission control signal from the second light-emission control end.

A second electrode of the light-emitting element is electrically connected to a second voltage terminal.

During the implementation, the pixel circuit may further include the light-emitting element, the first light-emission control circuit and the second light-emission control circuit, the first light-emission control circuit and the second light-emission control circuit are capable of light-emission control.

In at least one embodiment of the present disclosure, both the first light-emission control end and the second light-emission control end may be, but not limited to, the light-emission control end. In actual use, the first light-emission control end and the second light-emission control end may be different.

Figure 6:
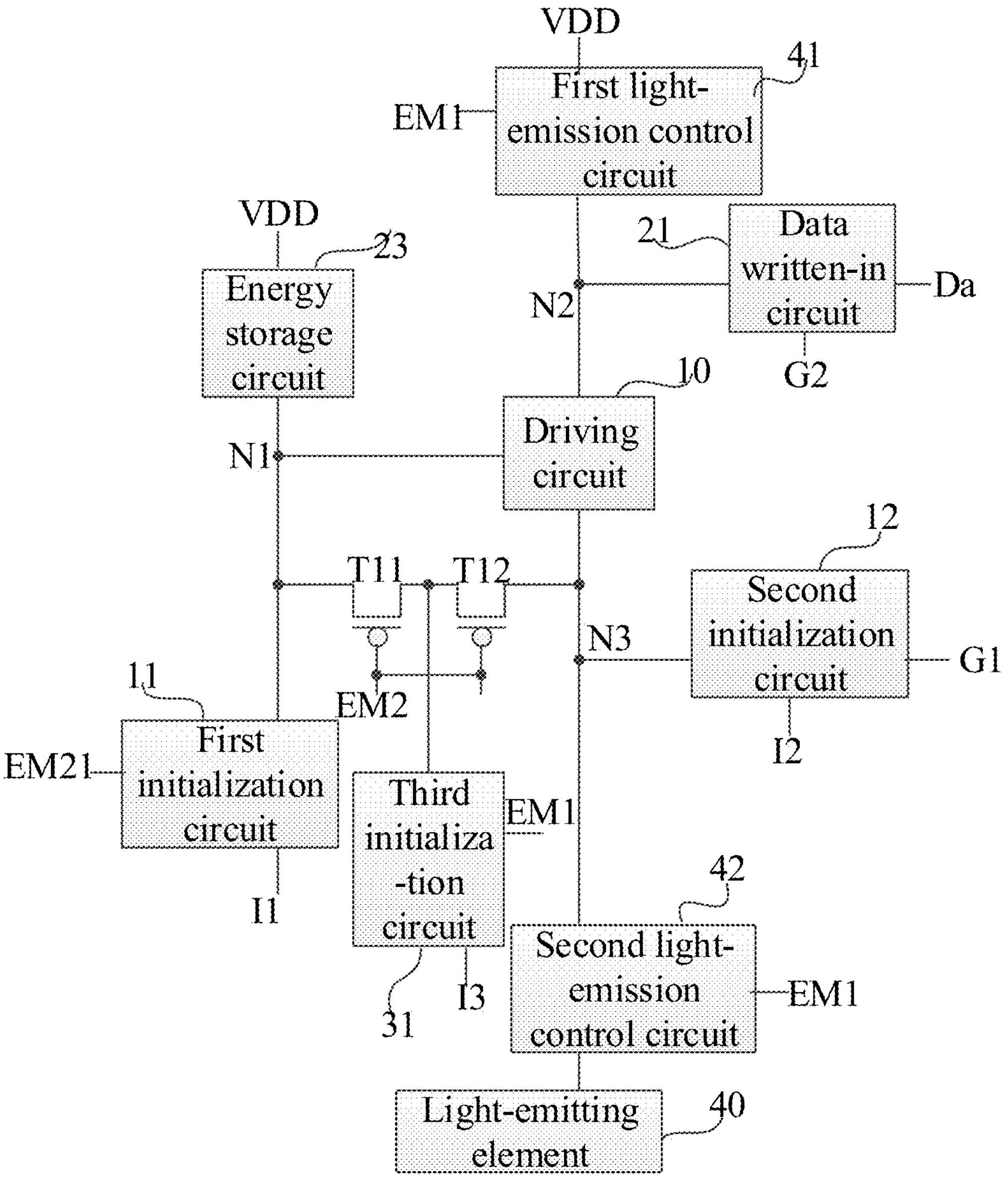
FIG. 6 is a schematic view showing a pixel circuit according to at least one embodiment of the present disclosure.

According to the at least one embodiment of the present disclosure, as shown in FIG. 6, on the basis of the pixel circuit in FIG. 5, the pixel circuit further includes a light-emitting element 40, a first light-emission control circuit 41 and a second light-emission control circuit 42.

The first light-emission control circuit 41 is electrically connected to the light-emission control end EM1, the power source voltage end VDD and the first end of the driving circuit 10, and configured to control the power source voltage end VDD to be electrically connected to, or electrically disconnected from, the first end of the driving circuit 10 under control of a light-emission control signal from the light-emission control end EM1.

The second light-emission control circuit 42 is electrically connected to the light-emission control end EM1, the second end of the driving circuit 10 and a first electrode of the light-emitting element 40, and configured to control the second end of the driving circuit 10 to be electrically connected to, or electrically disconnected from, the first electrode of the light-emitting element 40 under control of the light-emission control signal.

A second electrode of the light-emitting element 40 is electrically connected to a second voltage terminal V2.

In FIG. 6, both the first light-emission control end and the second light-emission control end are, but not limited to, the light-emission control end EM1. In actual use, the first light-emission control end and the second light-emission control end may be different control ends.

Optionally, the light-emitting element may be an organic light-emitting diode, the first electrode of the light-emitting element may be an anode, the second electrode of the light-emitting element may be a cathode, and the second voltage terminal V2 may be a low voltage terminal.

In at least one embodiment of the present disclosure, the pixel circuit may further include a fourth initialization circuit.

The fourth initialization circuit is electrically connected to the first scanning end, a fourth initial voltage line and the first electrode of the light-emitting element, and configured to write a fourth initial voltage from the fourth initial voltage line into the first electrode of the light-emitting element under control of the first scanning signal from the first scanning end.

During the implementation, the pixel circuit may further include the fourth initialization circuit, the fourth initialization circuit writes the fourth initial voltage from the fourth initial voltage line into the first electrode of the light-emitting element under control of the first scanning signal, so as to reset the potential of the first electrode of the light-emitting element, clear residual charges of the first electrode of the light-emitting element, and controls the light-emitting element not to emit light.

In at least one embodiment of the present disclosure, a difference between the voltage value of the fourth initial voltage and the voltage value of the second voltage signal from the second voltage terminal V2 may be less than an on voltage of the light-emitting element.

Optionally, an absolute value of the difference between the voltage value of the fourth initial voltage and the voltage value of the second voltage signal from the second voltage terminal V2 may be smaller than a voltage difference threshold. For example, the voltage difference threshold may be, but not limited to, 1 V.

Figure 7:
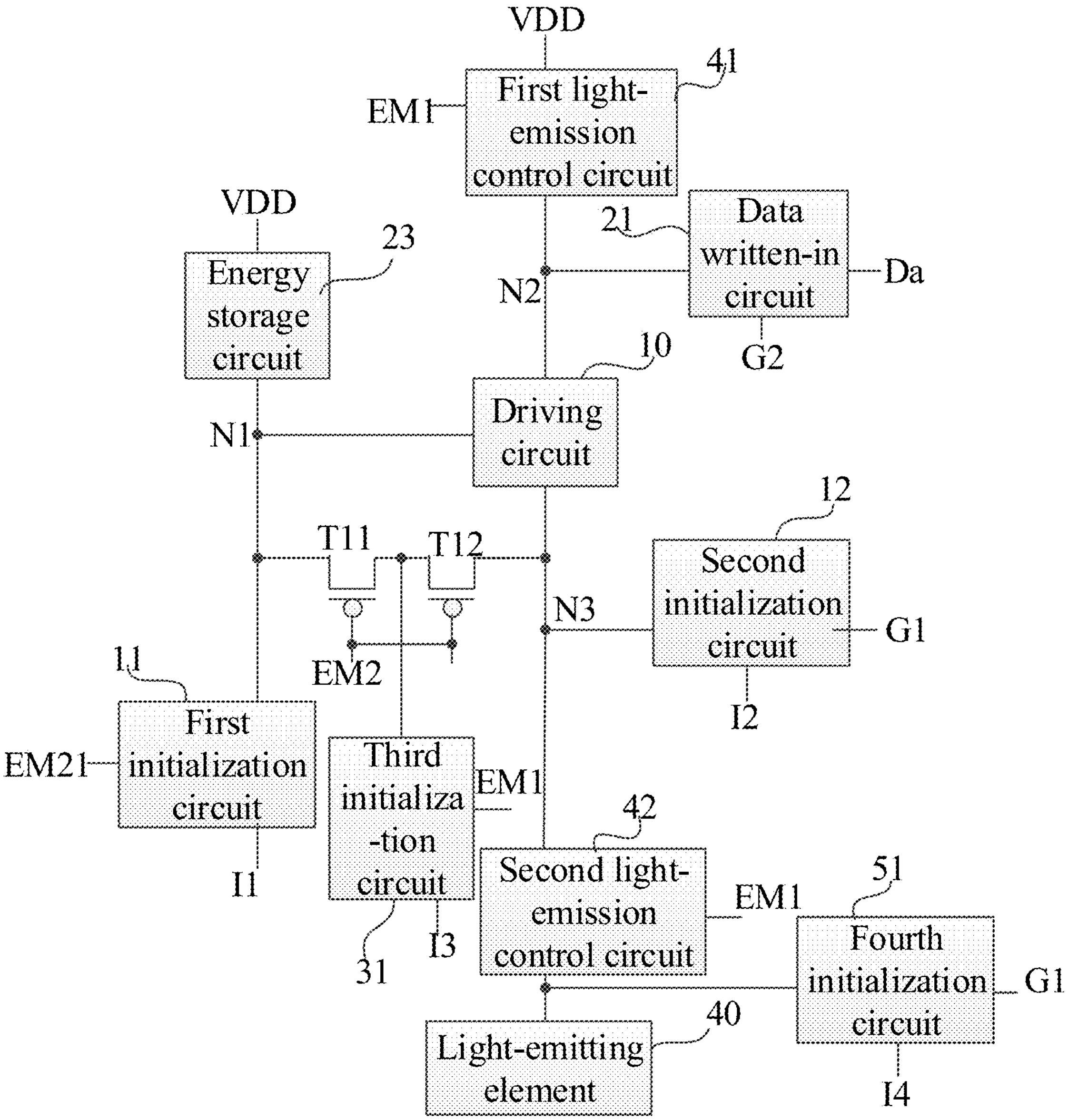
FIG. 7 is a schematic view showing a pixel circuit according to at least one embodiment of the present disclosure.

According to the at least one embodiment of the present disclosure, as shown in FIG. 7, on the basis of the pixel circuit in FIG. 6, the pixel circuit may further include a fourth initialization circuit 51.

The fourth initialization circuit 51 is electrically connected to the first scanning end G1, a fourth initial voltage line I4 and the first electrode of the light-emitting element, and configured to write the fourth initial voltage Vinit4 from the fourth initial voltage line I4 into the first electrode of the light-emitting element 40 under control of the first scanning signal of the first scanning end G1.

Optionally, the driving circuit includes a driving transistor, the first initialization circuit includes a second transistor, and the second initialization circuit includes a third transistor.

A gate electrode of the driving transistor is electrically connected to the first node, a first electrode of the driving transistor is electrically connected to the second node, and a second electrode of the driving transistor is electrically connected to the third node.

A gate electrode of the second transistor is electrically connected to the first control end, a first electrode of the second transistor is electrically connected to the first initial voltage line, and a second electrode of the second transistor is electrically connected to the first node.

A gate electrode of the third transistor is electrically connected to the first scanning end, a first electrode of the third transistor is electrically connected to the second initial voltage line, and a second electrode of the third transistor is electrically connected to the third node.

Optionally, the data written-in circuit includes a fourth transistor. A gate electrode of the fourth transistor is electrically connected to the second scanning end, a first electrode of the fourth transistor is electrically connected to the data line, and a second electrode of the fourth transistor is electrically connected to the second node. The energy storage circuit includes a storage capacitor. A first end of the storage capacitor is electrically connected to the first node, and a second end of the storage capacitor is electrically connected to a power source voltage end.

Optionally, the data written-in circuit includes a fourth transistor. A gate electrode of the fourth transistor is electrically connected to the second scanning end, a first electrode of the fourth transistor is electrically connected to the data line, and a second electrode of the fourth transistor is electrically connected to the first node. The energy storage circuit includes a storage capacitor, a first end of the storage capacitor is electrically connected to the first node, and a second end of the storage capacitor is electrically connected to the first voltage end.

Optionally, the data written-in circuit includes a fourth transistor. A gate electrode of the fourth transistor is electrically connected to the second scanning end, a first electrode of the fourth transistor is electrically connected to the data line, and a second electrode of the fourth transistor is electrically connected to the second end of the first energy storage circuit. The first energy storage circuit includes a first storage capacitor, and the second energy storage circuit includes a second storage capacitor. A first end of the first storage capacitor is electrically connected to the first node, a second end of the first storage capacitor is electrically connected to a first end of the second storage capacitor, and a second end of the second storage capacitor is electrically connected to the first voltage end.

Optionally, the first light-emission control circuit includes a fifth transistor, and the second light-emission control circuit includes a sixth transistor.

A gate electrode of the fifth transistor is electrically connected to the first light-emission control end, a first electrode of the fifth transistor is electrically connected to the power source voltage end, and a second electrode of the fifth transistor is electrically connected to the first end of the driving circuit.

A gate electrode of the sixth transistor is electrically connected to the second light-emission control end, a first electrode of the sixth transistor is electrically connected to the second end of the driving circuit, and a second electrode of the sixth transistor is electrically connected to the first electrode of the light-emitting element.

Optionally, the fourth initialization circuit includes a seventh transistor. A gate electrode of the seventh transistor is electrically connected to the first scanning end, a first electrode of the seventh transistor is electrically connected to the fourth initial voltage line, and a second electrode of the seventh transistor is electrically connected to the first electrode of the light-emitting element.

Optionally, the third initialization circuit includes an eighth transistor. A gate electrode of the eighth transistor is electrically connected to the light-emission control end, a first electrode of the eighth transistor is electrically connected to the third initial voltage line, and a second electrode of the eighth transistor is electrically connected to the intermediate node.

Figure 8:
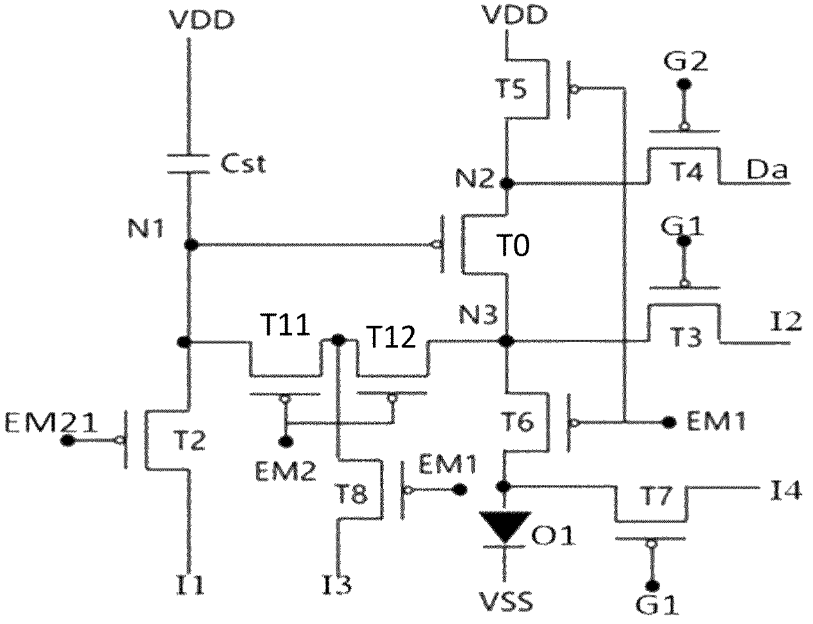
FIG. 8 is a circuit diagram of the pixel circuit according to at least one embodiment of the present disclosure.

As shown in FIG. 8, on the basis of the pixel circuit in FIG. 7, the driving circuit includes a driving transistor T0, the first initialization circuit includes a second transistor T2, and the second initialization circuit includes a third transistor T3. The light-emitting element is an organic light-emitting diode O1.

A gate electrode of the driving transistor T0 is electrically connected to the first node N1, a source electrode of the driving transistor T0 is electrically connected to the second node N2, and a drain electrode of the driving transistor T0 is electrically connected to the third node N3.

A gate electrode of the second transistor T2 is electrically connected to the first control end EM21, a source electrode of the second transistor T2 is electrically connected to the first initial voltage line I1, and a drain electrode of the second transistor T2 is electrically connected to the first node N1. The first initial voltage line I1 is used for providing the first initial voltage Vinit1.

A gate electrode of the third transistor T3 is electrically connected to the first scanning end G1, a source electrode of the third transistor T3 is electrically connected to the second initial voltage line I2, and a drain electrode of the third transistor T3 is electrically connected to the third node N3. The second initial voltage line I2 is used for providing the second initial voltage Vinit2.

The data written-in circuit includes a fourth transistor T4, and the energy storage circuit includes a storage capacitor Cst.

A gate electrode of the fourth transistor T4 is electrically connected to the second scanning end G2, a source electrode of the fourth transistor T4 is electrically connected to the data line Da, and a drain electrode of the fourth transistor T4 is electrically connected to the second node N2.

A first end of the storage capacitor Cst is electrically connected to the first node N1, and a second end of the storage capacitor Cst is electrically connected to the power source voltage end VDD.

The first light-emission control circuit includes a fifth transistor T5, and the second light-emission control circuit includes a sixth transistor T6.

A gate electrode of the fifth transistor T5 is electrically connected to the light-emission control end EM1, a source electrode of the fifth transistor T5 is electrically connected to the power source voltage end VDD, and a drain electrode of the fifth transistor T5 is electrically connected to the source electrode of the driving transistor T0.

A gate electrode of the sixth transistor T6 is electrically connected to the light-emission control end EM1, a source electrode of the sixth transistor T6 is electrically connected to the drain electrode of the driving transistor T0, and a drain electrode of the sixth transistor T6 is electrically connected to an anode of the organic light-emitting diode O1. A cathode of the organic light-emitting diode O1 is electrically connected to a low voltage end VSS.

The fourth initialization circuit includes a seventh transistor T7. A gate electrode of the seventh transistor T7 is electrically connected to the first scanning end G1, a source electrode of the seventh transistor T7 is electrically connected to the fourth initial voltage line I4, and a drain electrode of the seventh transistor T7 is electrically connected to the anode of the organic light-emitting diode O1. The fourth initial voltage line I4 is used for providing the fourth initial voltage Vinit4.

The third initialization circuit includes an eighth transistor T8. A gate electrode of the eighth transistor T8 is electrically connected to the light-emission control end EM, a source electrode of the eighth transistor T8 is electrically connected to the third initial voltage line I3, and a drain electrode of the eighth transistor T8 is electrically connected to an intermediate node. The third initial voltage line I3 is used to provide the third initial voltage Vinit3.

In the pixel circuit in FIG. 8, all transistors are, but not limited to, p-type transistors.

In the pixel circuit in FIG. 8, the first voltage terminal is the power source voltage end, the second voltage terminal is a low voltage terminal, and both the first light-emission control end and the second light-emission control end are, but not limited to, the light-emission control end.

In the pixel circuit in FIG. 8, the voltage value of Vinit1 may be greater than or equal to −5V and less than or equal to −3V, the voltage value of Vinit2 may be greater than or equal to 5V and less than or equal to 7V, the voltage value of Vinit3 may be greater than or equal to 0V and less than or equal to 3V, and the voltage value of Vinit4 may be greater than or equal to −4V and less than or equal to −2V.

In the pixel circuit in FIG. 8, the Vinit1 is set to a negative voltage and the Vinit2 is set to a positive voltage, so that when the Vinit1 is written into the first node N1 and the Vinit2 is written into the third node N3, the driving transistor T0 is in an on-bias state.

Through the Vinit3, at the refresh light-emitting stage and the maintaining light-emitting stage, the Vinit3 is written into the intermediate node, so that the potential at the intermediate node is not much different from the potential at the first node, thereby reducing the leakage of the first node N1.

Through the Vinit4, it is able to enable the organic light-emitting diode O1 not to emit light.

Figure 9:
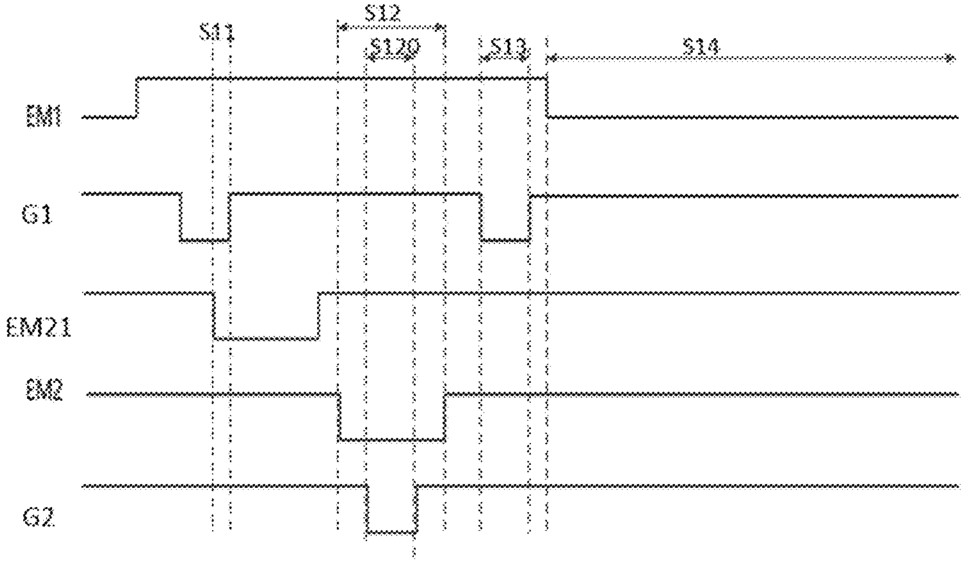
FIG. 9 is an operational timing diagram of the pixel circuit shown in FIG. 8 according to at least one embodiment of the present disclosure.

As shown in FIG. 9, during the operation of the pixel circuit in FIG. 8, the display period may include a refresh frame, the refresh frame includes a pre-written-in bias stage S11, a compensation stage S12, a post-written-in bias stage S13 and a refresh light-emitting stage S14 arranged one after another, and a data written-in stage S120 is in the compensation stage S12.

At the pre-written-in bias stage S11, EM1 provides a high voltage signal, both G1 and EM21 provide a low voltage signal, EM2 provides a high voltage signal, and G2 provides a high voltage signal. T3 is turned on, so as to write Vinit2 into the third node N3. T0 is turned on, so as to write Vinit2 into the second node N2. T2 is turned on, to write Vinit1 into the first node N1, so that T0 is in an on-bias state. At this time, there is a large voltage difference between N1 and N2, the absolute value of the gate-source voltage Vgs of T0 is relatively large, and a threshold voltage Vth of T0 is negatively biased, so as to eliminate the influence of different data voltages Vdata on Vth, thereby to mitigate the FFR phenomenon;

At the pre-written-in bias stage S11, G1 provides a low voltage signal, and T7 is opened to write the Vinit4 into the anode of O1, so as clear residual charges on the anode of O1.

At the compensation stage S12, EM2 provides a low voltage signal, T11 and T12 are turned on to control N1 to be electrically connected to N3.

At the data written-in stage S120, G2 provides a low voltage signal, T4 is turned on, and Da provides a data voltage Vdata to the second node N2.

At the beginning of the data written-in stage S120, T0 is turned on, and the Cst is charged by Vdata through T4, T0 and T2, so as to increase the potential at N1, until the Vgs of T0 becomes Vth, and T0 is turned off. At this time, a potential at the gate electrode of T0 is Vdata+Vth.

At the post-written-in bias stage S13, EM1 provides a high voltage signal, G1 provides a low voltage signal, EM21, EM2 and G2 all provide a high voltage signal, T3 is turned on to write Vinit2 into N3, and T0 is turned on to write Vinit2 into the second node N2. T0 is controlled to be in an on-bias state, and T7 is turned on to write Vinit4 into the anode of O1, so as to clear the residual charges at the anode of O1.

At the refresh light-emitting stage S14, EM1 provides a low voltage signal, T5 and T6 are turned on, and T0 drives O1 to emit light. At this time, the potential at N1 is Vdata+Vth, the gate-source voltage of T0 is Vdata+Vth-VDD, and a driving current of T0 is independent of Vth, so as to perform threshold voltage compensation. T8 is turned on to write Vinit3 into the intermediate node, and the potential of Vinit3 is not much different from that of N1, so that the leakage current of N1 can be reduced, facilitating the maintenance of the potential at N1.

In the pixel circuit in FIG. 8, EM2 is used to control the on-off of T11 and T12, and the second control signal from EM2 may be provided by an EM GOA circuit (the EM GOA circuit is a light-emission control signal generating circuit arranged on the array substrate), so as to realize the current leakage and high-frequency display.

As shown in FIG. 9, a time period during which G1 provides a low voltage signal partially overlaps a time period during which EM21 provides a low voltage signal, and a time period during which G2 provides a low voltage signal is included in a time period during which EM2 provides a low voltage signal.

During the implementation, N1 and N2 are reset at the same time at the pre-written-in bias stage. If a reset time-takes too long, the VRR may become worse, because the gate-source voltage Vgs of T0 is too large, which will make the negative bias of Vth too much. When the data is actually written, in the refresh frame, the Vth is not allowed to be negatively biased, and there is no problem in a case of continuous refresh. However, no data voltage is written in the maintaining frame, the Vth may gradually restore, and a difference in Vth between the refresh frame and the maintaining frame is too large, and thereby the VRR may deteriorate. Based on this, in at least one embodiment of the present disclosure, duration of the pre-written-in bias stage is controlled, and T0 is controlled to be in an on-bias state during the maintaining bias stage included in the maintaining frame, so as to mitigate VRR.

Figure 10:
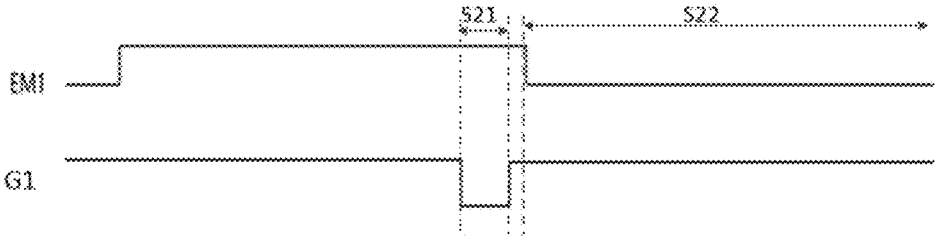
FIG. 10 is an operational timing diagram of the pixel circuit shown in FIG. 8 according to at least one embodiment of the present disclosure.

Optionally, a time where EM21 provides a low voltage signal is at least 3 rows earlier than a time where EM2 provides a low voltage signal. For example, an Nth row GOA circuit provides a low voltage signal to the EM21, and a (N−3)th row GOA circuit or a (N−7)th row GOA circuit provides a low voltage signal to the EM21, so as to facilitate resetting the N1 node as early as possible, where N is a positive integer. As shown in FIG. 10, during the operation of the pixel circuit in FIG. 8, the display period may include a maintaining frame, the maintaining frame includes a maintaining bias stage S21 and a maintaining light-emitting stage S22 arranged one after another.

At the maintaining bias stage S21, EM1 provides a high voltage signal, G1 provides a low voltage signal, and T3 is turned on to write Vinit2 into N3, so as to control T0 to be in an on-bias state.

At the maintaining light-emitting stage S22, EM1 provides a low voltage signal, G1 provides a high voltage signal, T5 and T6 are turned on, and T0 drives O1 to emit light.

In the maintaining frame, EM21, EM2 and G2 all provide a high voltage signal.

In the pixel circuit in FIG. 8, the first scanning signal from G1 may be provided by a first GOA (Gate On Array, a gate electrode driving circuit on an array substrate) circuit, the second scanning signal from G2 may be provided by a second GOA circuit, the light-emission control signal from EM1 may be provided by a first EM GOA circuit, the first control signal from EM21 and the second control signal from EM2 may be provided by a second EM GOA circuit, and a structure of the first EM GOA circuit may be the same as the second EM GOA circuit.

Figure 11:
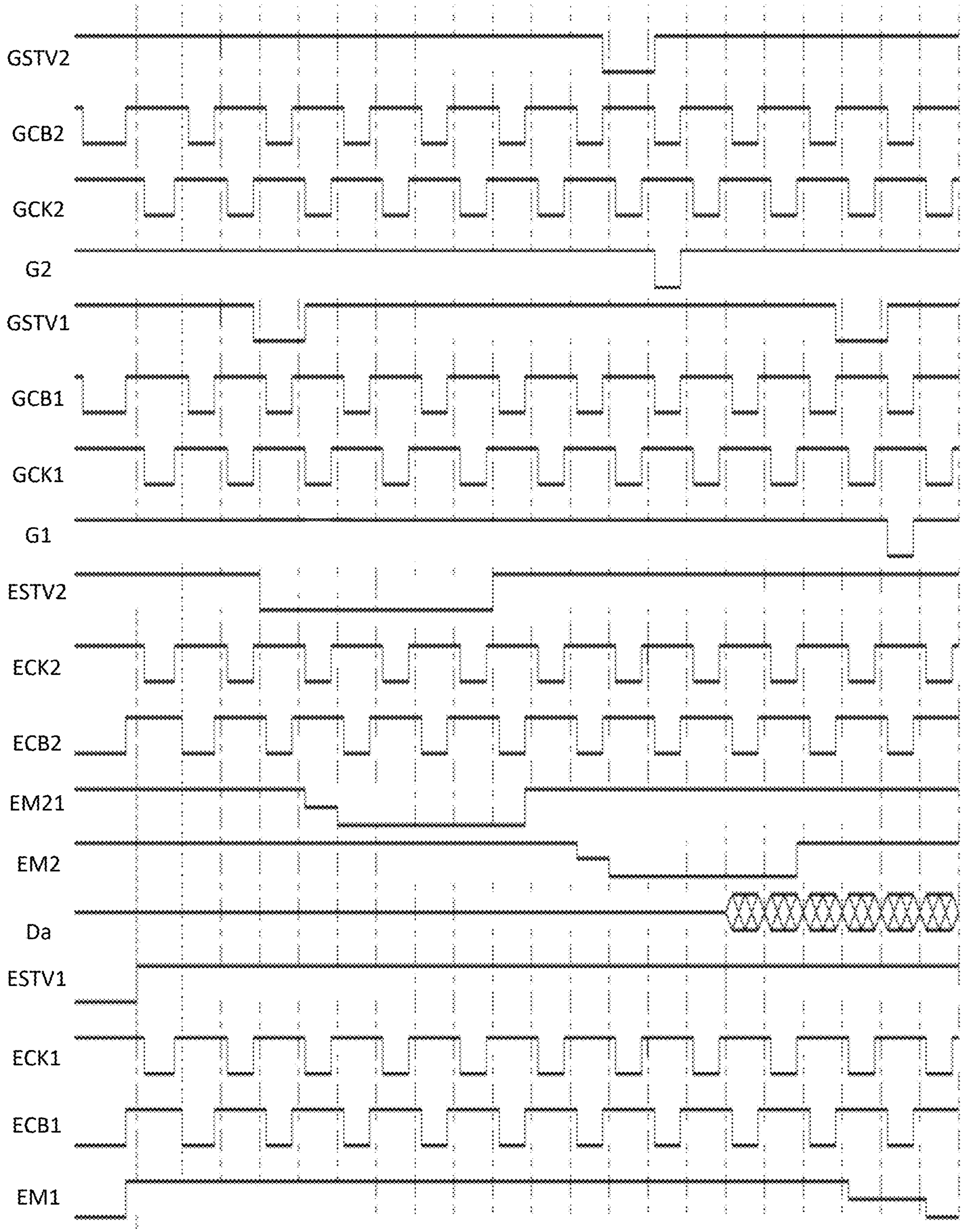
FIG. 11 is an operational timing sequence diagram of each GOA (Gate On Array, a gate electrode driving circuit on an array substrate) circuit of the pixel circuit shown in FIG. 8 according to at least one embodiment of the present disclosure.

FIG. 11 is a timing sequence diagram of the operation of each GOA circuit corresponding to the pixel circuit in FIG. 8.

In FIG. 11, GSTV2 denotes a second initial voltage, GCB2 denotes a second one of second clock signals, GCK2 denotes a second one of first clock signals, G2 denotes a second control end, GSTV1 denotes a first initial voltage, GCB1 denotes a first one of second clock signals, GCK1 denotes a first one of first clock signals, G1 denotes a first control end, ESTV2 denotes a second light-emission control initial voltage, ECK2 denotes a second one of third clock signals, ECB2 denotes a second one of fourth clock signals, EM21 denotes a first control end, EM2 denotes a second control end, Da denotes a data line, ESTV1 denotes a first light-emission control initial voltage, ECK1 denotes a first one of third clock signals, ECB1 denotes a first one of fourth clock signals, and EM1 denotes a light-emission control end.

Figure 12:
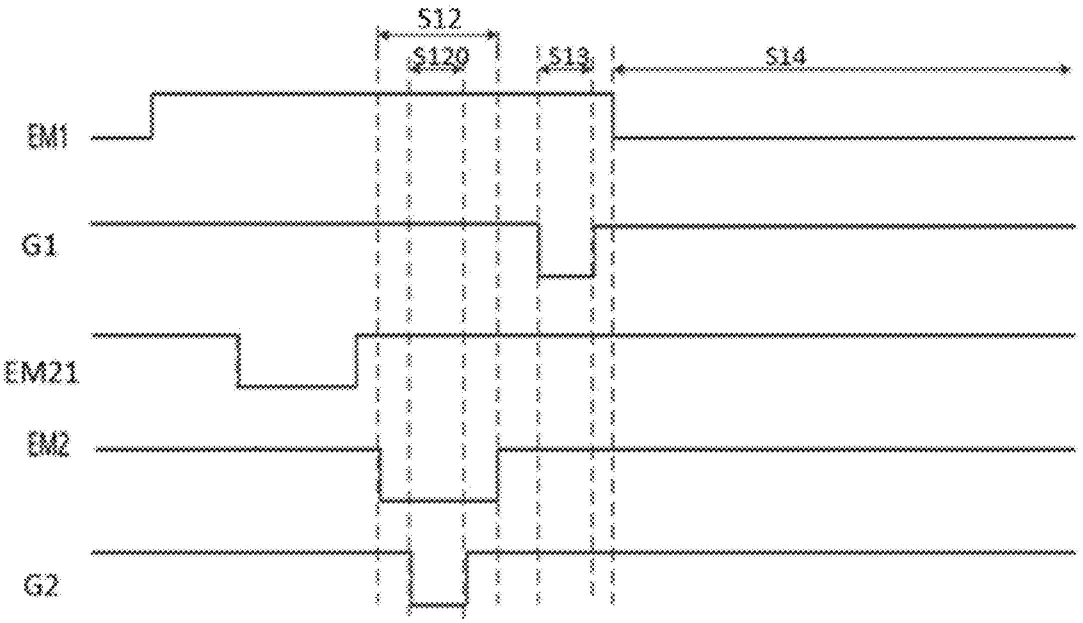
FIG. 12 is an operational timing sequence diagram of the pixel circuit shown in FIG. 8 according to at least one embodiment of the present disclosure.

As shown in FIG. 12, during the operation of the pixel circuit in FIG. 8, the display period may include a refresh frame, the refresh frame includes a compensation stage S12, a post-written-in bias stage S13 and a refresh light-emitting stage S14 arranged one after another, and a data written-in stage S120 is within the compensation stage S12.

At the compensation stage S12, EM2 provides a low voltage signal, T11 and T12 are turned on to control N1 to be electrically connected to N3.

At the data written-in stage S120, G2 provides a low voltage signal, T4 is turned on, and Da provides a data voltage Vdata to the second node N2.

At the beginning of the data written-in stage S120, T0 is turned on, and the Vdata charges the Cst via T4, T0 and T2 so as to increase the potential at N1, until the Vgs of T0 becomes Vth, and T0 is turned off. At this time, a potential at the gate electrode of T0 is Vdata+Vth.

At the post-written-in bias stage S13, EM1 provides a high voltage signal, G1 provides a low voltage signal, EM21, EM2 and G2 all provide a high voltage signal, T3 is turned on to write Vinit2 into N3, and T0 is turned on to write Vinit2 into the second node N2. T0 is controlled to be in an on-bias state, and T7 is turned on to write Vinit4 into the anode of O1, so as to clear the residual charges at the anode of O1.

At the refresh light-emitting stage S14, EM1 provides a low voltage signal, T5 and T6 are turned on, and T0 drives O1 to emit light. At this time, the potential at N1 is Vdata+Vth, the gate-source voltage of T0 is Vdata+Vth-VDD, and a driving current of T0 is independent of Vth, so as to perform threshold voltage compensation. T8 is turned on to write Vinit3 into the intermediate node, and the potential of Vinit3 is not much different from that of N1, so that the leakage current of N1 can be reduced, facilitating the maintenance of the potential at N1.

Figure 13:
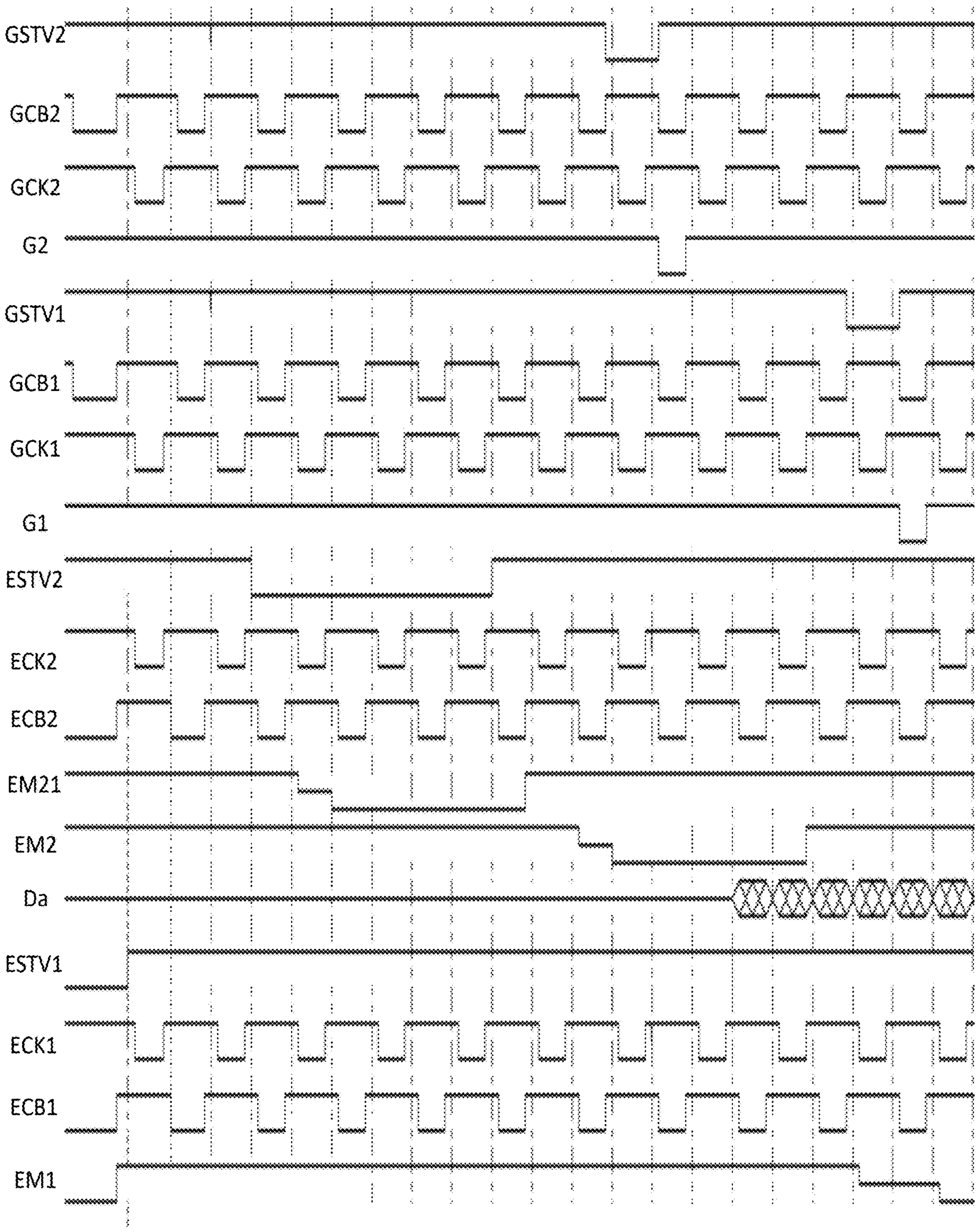
FIG. 13 is an operational timing sequence diagram of each GOA circuit of the pixel circuit shown in FIG. 8 according to at least one embodiment of the present disclosure.

FIG. 13 is an operational timing sequence diagram for each GOA circuit corresponding to the pixel circuit in FIG. 8.

In FIG. 13, GSTV2 denotes a second initial voltage, GCB2 denotes a second one of second clock signals, GCK2 denotes a second one of first clock signals, G2 denotes a second control end, GSTV1 denotes a first initial voltage, GCB1 denotes a first one of second clock signals, GCK1 denotes a first one of first clock signals, G1 denotes a first control end, ESTV2 denotes a second light-emission control initial voltage, ECK2 denotes a second one of third clock signals, ECB2 denotes a second one of fourth clock signals, EM21 denotes a first control end, EM2 denotes a second control end, Da denotes a data line, ESTV1 denotes a first light-emission control initial voltage, ECK1 denotes a first one of third clock signals, ECB1 denotes a first one of fourth clock signals, and EM1 denotes a light-emission control end.

Figure 14:
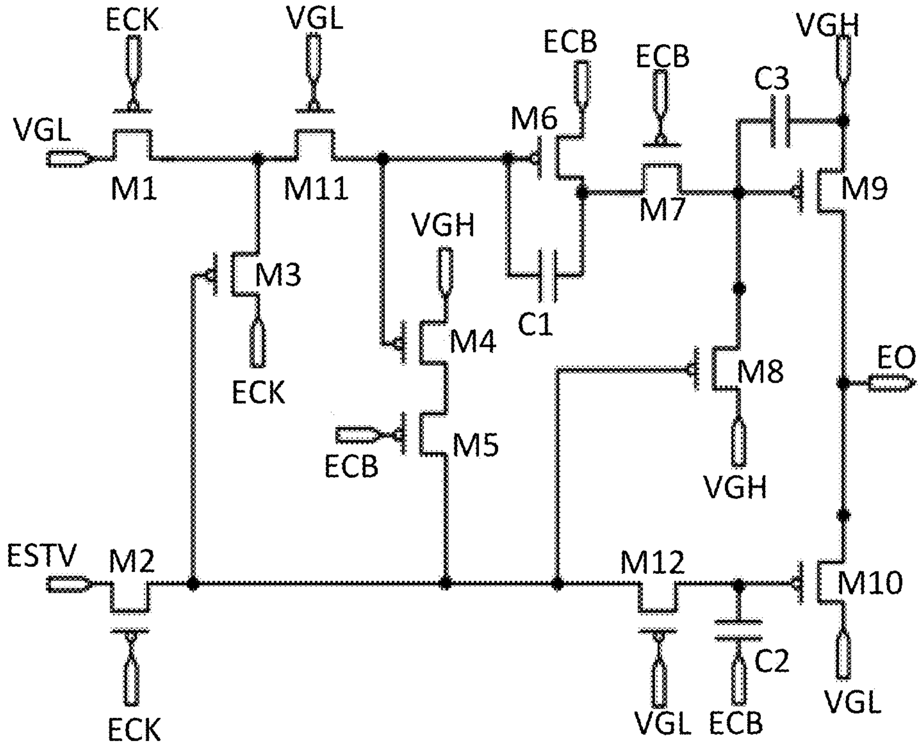
FIG. 14 is a circuit diagram of a primary light-emission control signal generation unit included in a light-emission control signal generating circuit.

FIG. 14 is a circuit diagram of a primary light-emission control signal generation unit included in the light-emission control signal generating circuit.

As shown in FIG. 14, the light-emission control signal generation unit includes a first control transistor M1, a second control transistor M2, a third control transistor M3, a fourth control transistor M4, a fifth control transistor M5, a sixth control transistor M6, a seventh control transistor M7, an eighth control transistor M8, a ninth control transistor M9, a tenth control transistor M10, an eleventh control transistor M11, a twelfth control transistor M12, a first capacitor C1, a second capacitor C2 and a third capacitor C3.

A gate electrode of the M1 receives a third clock signal ECK, a source electrode of the M2 is electrically connected to a low level end VGL, and a drain electrode of the M1 is electrically connected to a source electrode of M11.

A gate electrode of the M11 is electrically connected to a low level end VGL, and a drain electrode of the M11 is electrically connected to a gate electrode of the M6.

A gate electrode of the M2 receives the third clock signal ECK, a source electrode of the M2 receives the light-emission control starting voltage ESMV, and a drain electrode of the M2 is electrically connected to a gate electrode of the M3.

A source electrode of the M3 receives the third clock signal ECK, and a drain electrode of the M3 is electrically connected to the drain electrode of the M1.

A gate electrode of M4 is electrically connected to the gate electrode of M6, a source electrode of M4 is electrically connected to a high-level end VGH, and a drain electrode of M4 is electrically connected to the source electrode of M5.

A gate electrode of the M5 receives a fourth clock signal ECB, and a drain electrode of the M5 is electrically connected to the gate electrode of the M3.

A source electrode of the M6 receives the fourth clock signal ECB, and a drain electrode of the M6 is electrically connected to a source electrode of the M7.

A gate electrode of the M7 receives the fourth clock signal ECB, and a drain electrode of the M7 is electrically connected to a gate electrode of the M9.

A gate electrode of the M8 is electrically connected to the gate electrode of the M3, a source electrode of the M8 is electrically connected to a high-level end VGH, and a drain electrode of the M8 is electrically connected to the gate electrode of the M9.

A source electrode of the M9 is electrically connected to the high-level end VGH, and a drain electrode of the M9 is electrically connected to a light-emission control signal output end EO.

A gate electrode of the M10 is electrically connected to a drain electrode of the M12, a source electrode of the M10 is electrically connected to the low level end VGL, and a drain electrode of the M10 is electrically connected to the light-emission control signal output end EO.

A gate electrode of the M12 is electrically connected to the low level end VGL, and a source electrode of the M12 is electrically connected to the gate electrode of the M8.

A first end of C1 is electrically connected to the gate electrode of M6, and a second end of C2 is electrically connected to the drain electrode of M6.

A first end of C2 is connected to the fourth clock signal ECB, and a second end of C2 is electrically connected to the gate electrode of M10.

A first end of C3 is electrically connected to the gate electrode of M9, and a second end of C3 is electrically connected to the high level terminal VGH.

In FIG. 14, each transistor may be, but not limited to, a p-type transistor.

When the pixel circuit in FIG. 8 is not used at ultra-high frequencies, and a highest frequency is 120 Hz, the potential of N3 may not be reset before the data written-in stage, but only after the data written-in stage, provided that IC (Integrated Circuit) support is guaranteed. Furthermore, the refresh frame includes the refresh light-emitting stage, the maintaining frame includes the maintaining light-emitting stage, the refresh light-emitting stage includes a plurality of refresh light-emitting time periods independent of each other, and the maintaining light-emitting stage includes a plurality of maintaining light-emitting time periods independent of each other. Before the refresh light-emitting time period, the potential of N3 is reset in a corresponding refresh bias time period, and before the maintaining light-emitting time period, the potential of N3 is reset in a corresponding maintaining bias time period. As a result, in the maintaining frame, it is able to control the driving transistor to be in an on-bias state for multiple times, so as to pull down the Vth for multiple times, thereby to effectively prevent Vth from restoring and mitigating the VRR phenomenon at low frequencies.

Figure 15:
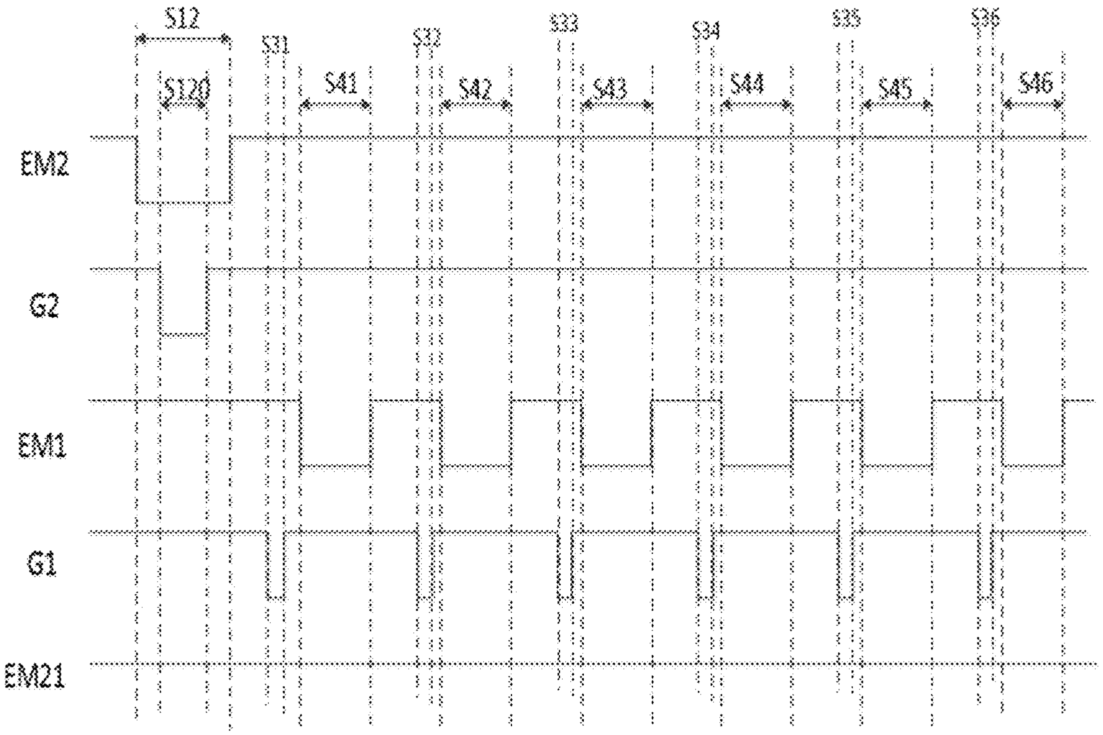
FIG. 15 is an operational timing sequence diagram of the pixel circuit shown in FIG. 8 according to at least one embodiment of the present disclosure.

As shown in FIG. 15, during the operation of the pixel circuit in FIG. 8, a refresh frame includes a compensation stage S12, a refresh bias stage, and a refresh light-emitting stage. The data written-in stage S120 is within the compensation stage S12, and the compensation stage S12 is arranged before the refresh bias stage and the refresh light-emitting stage.

At the compensation stage S12, EM1 provides a high voltage signal, EM2 provides a low voltage signal, EM21 provides a high voltage signal, G1 provides a high voltage signal, T11 and T12 are turned on to enable N1 to be electrically connected to N3.

At the data written-in stage S120, G2 provides a low voltage signal, T4 is turned on, to write a data voltage Vdata from Da into N2.

At the beginning of the data written-in stage S120, T0 is turned on, and the Vdata charges the Cst via T4, T0, T11 and T12 until T0 is turned off. At this time, the gate-source voltage of T0 is Vth, and a potential at the gate electrode of T0 is Vdata+Vth.

The refresh bias stage may include a plurality of refresh bias time periods independent of each other, the refresh light-emitting stage includes a plurality of refresh light-emitting time periods independent of each other, and each refresh bias time period is arranged before a corresponding refresh light-emitting time period.

In FIG. 15, S31 denotes a first refresh bias time period, S41 denotes a first refresh light-emitting time period, S32 denotes a second refresh bias time period, S42 denotes a second refresh light-emitting time period, S33 denotes a third refresh bias time period, S43 denotes a third refresh light-emitting time period, S34 denotes a fourth refresh bias time period, S44 denotes a fourth refresh light-emitting time period, S35 denotes a fifth refresh bias time period, S45 denotes a fifth refresh light-emitting time period, S36 denotes a sixth refresh bias time period, and S46 denotes a sixth refresh light-emitting time period.

Within each refresh bias time period, G1 provides a low voltage signal, and T3 is turned on to write Vinit2 into N3, and T0 is turned on to reset the potential of N3 and the potential of N2, so as to control T0 to be in an on-bias state.

Within each refresh light-emitting time period, G1 provides a high voltage signal, EM1 provides a low voltage signal, T5 and T6 are turned on, and T0 drives O1 to emit light.

As shown in FIG. 15, during the refresh frame, EM21 provides a high voltage signal.

Figure 16:
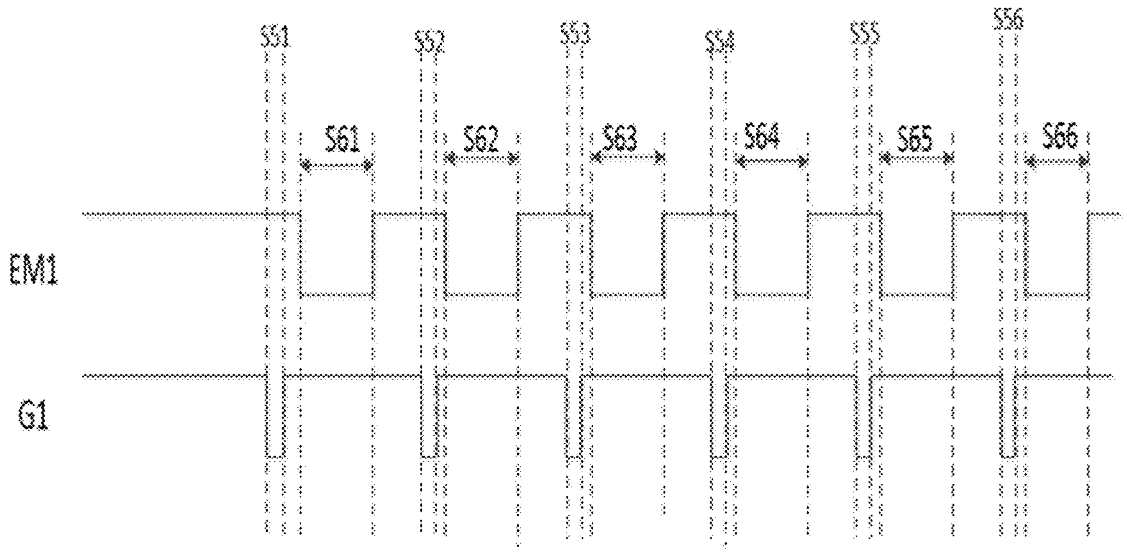
FIG. 16 is an operational timing sequence diagram of the pixel circuit shown in FIG. 8 according to at least one embodiment of the present disclosure.

As shown in FIG. 16, during the operation of the pixel circuit in FIG. 8, the maintaining frame includes a maintaining bias stage and a maintaining light-emitting stage.

The maintaining bias stage may include a plurality of maintaining bias time periods independent of each other, the maintaining light-emitting stage includes a plurality of maintaining light-emitting time periods independent of each other, and each maintaining bias time period is arranged before a corresponding maintaining light-emitting time period.

In FIG. 16, S51 denotes a first maintaining bias period, S61 denotes a first maintaining light-emitting time period, S52 denotes a second maintaining bias period, S62 denotes a second maintaining light-emitting time period, S53 denotes a third maintaining bias period, S63 denotes a third maintaining light-emitting time period, S54 denotes a fourth maintaining bias period, S64 denotes a fourth maintaining light-emitting time period, S55 denotes a fifth maintaining bias period, S65 indicates a fifth maintaining light-emitting time period, S56 denotes a sixth maintaining bias time period denoted by, and S66 denotes a sixth maintaining light emission time period.

Within each maintaining bias time period, G1 provides a low voltage signal, and T3 is turned on to write Vinit2 into N3, and T0 is turned on to reset the potential of N3 and the potential of N2, so as to control T0 to be in an on-bias state.

Within each maintaining light-emitting time period, G1 provides a high voltage signal, EM1 provides a low voltage signal, T5 and T6 are turned on, and T0 drives O1 to light.

During the maintaining frame, EM21, EM2 and G2 each provides a high voltage signal.

In the pixel circuit according to at least one embodiment of the present disclosure, it is able to mitigate FFR and VRR, so as to realize a high frequency display and a low frequency display. In addition, applications that the pixel circuit is applied to may be appropriately selected according to different requirements, while meeting requirements on the first frame response speed and the frequency-switching flicker specification.

Figure 17:
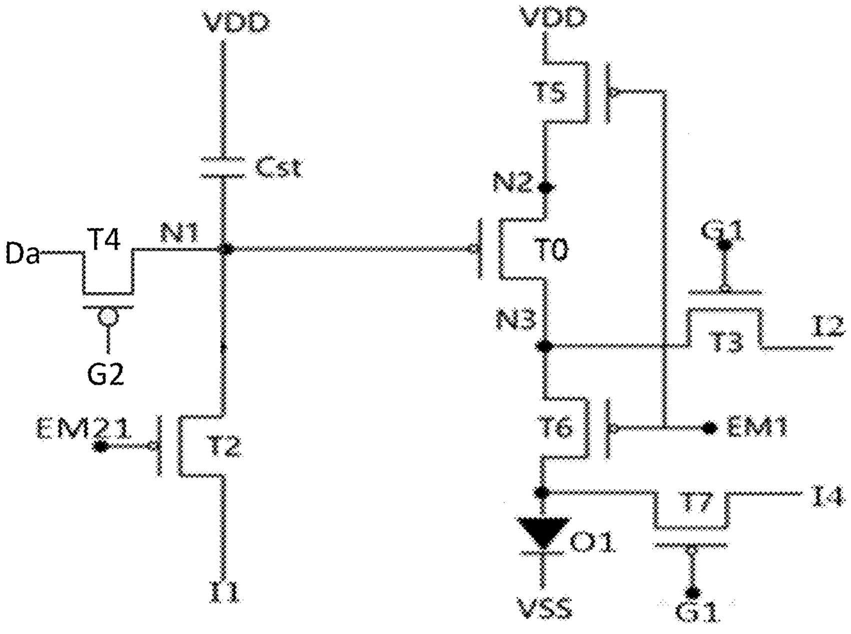
FIG. 17 is a circuit diagram of the pixel circuit according to at least one embodiment of the present disclosure.

The pixel circuit in FIG. 17 differs from the pixel circuit in FIG. 8 in that T11, T12 and T8 are not provided, and the drain electrode of T4 is electrically connected to the first node N1.

In the pixel circuit in FIG. 17, it is not possible to perform threshold voltage compensation, based on this, in the pixel circuit in FIG. 8, the drain electrode of T4 is electrically connected to the second node N2, and T11, T12, and T8 are added.

Figure 18:
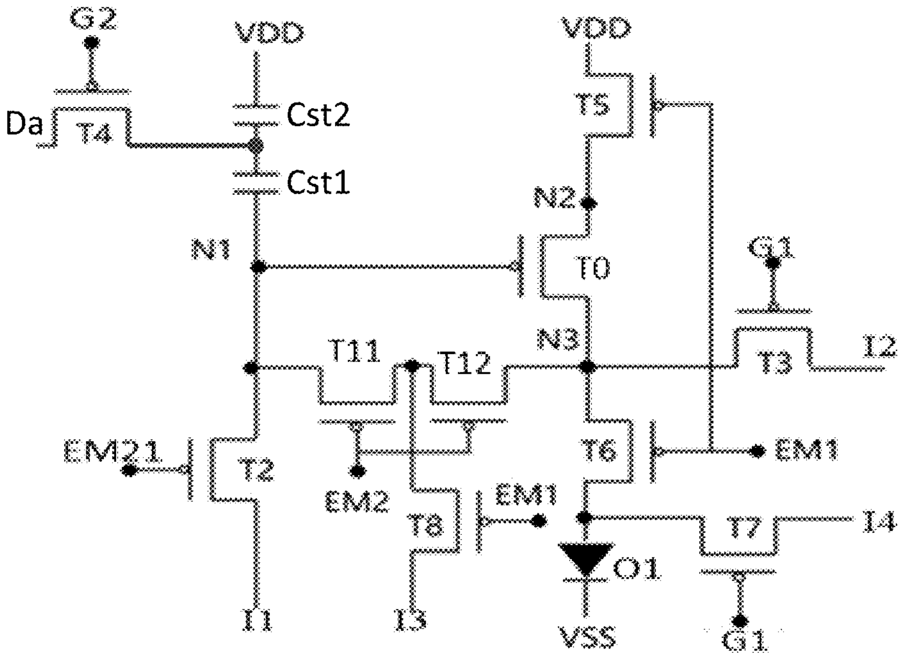
FIG. 18 is a circuit diagram of the pixel circuit according to at least one embodiment of the present disclosure.

The pixel circuit in FIG. 18 differs from the pixel circuit in FIG. 8 in that the storage capacitor Cst is not included, and a first energy storage circuit and a second energy storage circuit are included.

The first energy storage circuit includes a first storage capacitor Cst1, and the second energy storage circuit includes a second storage capacitor Cst2.

A drain electrode of T4 is electrically connected to a second end of the Cst1. A first end of the Cst1 is electrically connected to the first node N1, a second end of the Cst1 is electrically connected to a first end of the Cst2, and a second end of the Cst2 is electrically connected to the power source voltage end VDD.

In the pixel circuit in FIG. 18, a capacitance value of Cst1 may be larger than the capacitance value of Cst2 in order to guarantee the stability of the potential at the first node N1.

In at least one embodiment of the present disclosure, the first initial voltage may be a negative voltage, the second initial voltage may be a positive voltage, the third initial voltage may be a positive voltage, and the fourth initial voltage may be a negative voltage.

In at least one embodiment of the present disclosure, the first initial voltage line for providing the first initial voltage Vinit1 and the second initial voltage line for providing the second initial voltage Vinit2 may be formed in different metal layers, and the first initial voltage line and the second initial voltage line may be parallel to each other, so as to avoid that a voltage line providing a positive voltage overlaps a voltage line providing a negative voltage, and prevent the voltage stability from being adversely affected.

For example, the first initial voltage line may be formed at a second gate metal layer, and the first initial voltage line may be arranged at a same layer as a gate electrode of a driving transistor of a pixel circuit. The second initial voltage line may be formed at a first source/drain metal layer, and the second initial voltage line may be arranged at a same layer as a source electrode and a drain electrode of the driving transistor. In addition, a line width of the second initial voltage line may be greater than a line width of the first initial voltage line, thereby facilitating the stability of the positive voltage and reducing a voltage drop.

Optionally, the first initial voltage line and the fourth initial voltage line may be formed at a first metal layer, and the second initial voltage line and the third initial voltage line may be formed at a second metal layer;

For example, the first metal layer may be, but not limited to, a second gate metal layer, and the second metal layer may be, but not limited to, the first source/drain metal layer.

Optionally, the first initial voltage line, the second initial voltage line, the third initial voltage line and the fourth initial voltage line may extend in a transverse direction, and the first initial voltage line, the second initial voltage line, the third initial voltage line and the fourth initial voltage line are arranged on a base substrate, and orthographic projections of initial voltage lines onto the base substrate may be arranged sequentially in a longitudinal direction.

In at least one embodiment of the present disclosure, the initial voltage line providing the positive voltage and the initial voltage line providing the negative voltage may be alternately arranged, so as to ensure charge neutralization on the base substrate and to prevent a display screen from being adversely affected by residual charges.

Figure 19:
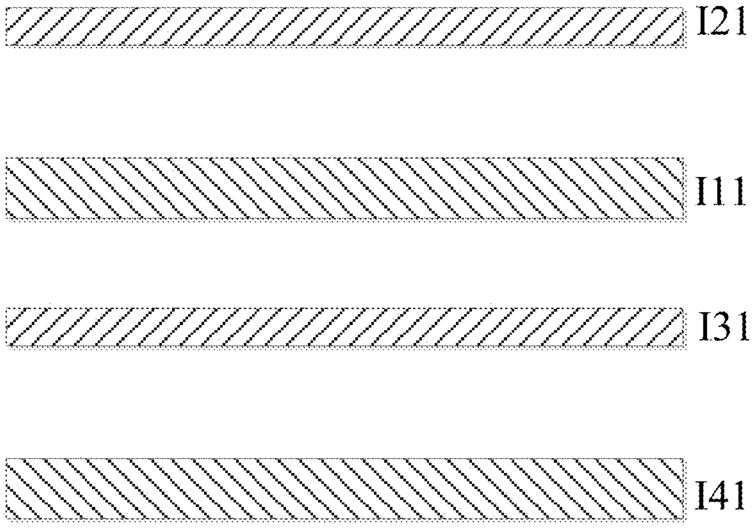
FIG. 19 is a schematic view showing an orthographic projection of each initial voltage line onto a base substrate.

As shown in FIG. 19, I11 denotes an orthographic projection of a first initial voltage line I1 onto the base substrate, I21 denotes an orthographic projection of a second initial voltage line I2 onto the base substrate, I31 denotes an orthographic projection of a third initial voltage line I3 onto the base substrate, and I41 denotes an orthographic projection of a fourth initial voltage line I4 onto the base substrate.

I21, I11, I31 and I41 are sequentially arranged along a vertical direction, and I21, I11, I31 and I41 are parallel to each other.

In FIG. 19, a line width of I2 and a line width of I3 are large.

In FIG. 19, the first initial voltage line and the fourth initial voltage line may be, but not limited to, formed at a second gate metal layer, and the second initial voltage line and the third initial voltage line may be, but not limited to, formed at the first source/drain metal layer.

According to an embodiment of the present disclosure, a pixel driving method applied to the above-mentioned pixel circuit is provided. A display period includes a maintaining frame, and the maintaining frame includes a maintaining bias stage. The pixel driving method includes: at the maintaining bias stage, writing, by the first initialization circuit, a first initial voltage into the first node under control of a first control signal; writing, by the second initialization circuit, a second initial voltage to the third node under control of a first scanning signal, to enable a driving transistor of the driving circuit to be in an on-bias state.

In at least one embodiment of the present disclosure, at the maintaining bias stage, the driving transistor is controlled in an on-bias state during the maintaining bias stage included in the maintaining frame, so as to pull down Vth, thereby to mitigate VRR issues.

Optionally, the pixel circuit further includes a first light-emission control circuit, a second light-emission control circuit and a light-emitting element. The maintaining bias stage includes a plurality of maintaining bias time periods, the maintaining frame further includes a plurality of maintaining light-emitting time periods, the maintaining bias time periods and the maintaining light-emitting time periods are arranged alternately, and the pixel driving method includes:

in the maintaining bias time period, writing, by the first initialization circuit, the first initial voltage into the first node under control of the first control signal; writing, by the second initialization circuit, the second initial voltage into the third node under control of the first scanning signal, to enable the driving transistor of the driving circuit to be in the on-bias state;

in the maintaining light-emitting time period, controlling, by the first light-emission control circuit, a power source voltage end to be electrically connected to the first end of the driving circuit under control of a first light-emission control signal, controlling, by the second light-emission control circuit, the second end of the driving circuit to be electrically connected to a first electrode of the light-emitting element under control of a second light-emission control signal, and driving, by the driving circuit, the light-emitting element.

In at least one embodiment of the present disclosure, the display period further includes a refresh frame arranged between maintaining frames, the refresh frame includes a pre-written-in bias stage arranged before a data written-in stage, and the pixel driving method includes:

at the pre-written-in bias stage, writing, by the first initialization circuit, the first initial voltage into the first node under control of the first control signal; writing, by the second initialization circuit, the second initial voltage to the third node under control of the first scanning signal, to enable the driving transistor of the driving circuit to be in the on-bias state.

In the pixel driving method according to at least one embodiment of the present disclosure, in the refresh frame and before data written-in and charging, the driving transistor of the driving circuit is controlled to be in the on-bias state, so as to pull down the Vth of the driving transistor without being adversely affected by a data voltage of a previous frame, thereby to address first frame rate (FFR) issues.

In at least one embodiment of the present disclosure, the display period further includes a refresh frame arranged between maintaining frames, the refresh frame further includes a post-written-in bias stage arranged after the data written-in stage, and the pixel driving method includes:

at the post-written-in bias stage, writing, by the first initialization circuit, the first initial voltage into the first node under control of the first control signal; writing, by the second initialization circuit, the second initial voltage into the third node under control of the first scanning signal, to enable the driving transistor of the driving circuit to be in the on-bias state.

Optionally, the pixel circuit includes a data written-in circuit, and the pixel driving method further includes:

at the data written-in stage, writing, by the data written-in circuit, a data voltage on a data line to the second node under control of a second scanning signal from a second scanning end.

In at least one embodiment of the present disclosure, the pixel circuit further includes a compensation control circuit, the refresh frame further includes a compensation stage, the data written-in stage is within the compensation stage, the data written-in stage is arranged before the post-written-in bias stage, and the pixel driving method includes:

at the compensation stage, controlling, by the compensation control circuit, the first node to be electrically connected to the third node under control of a second control signal from a second control end.

Optionally, the pixel circuit further includes a light-emitting element, a first light-emission control circuit and a second light-emission control circuit, the refresh frame further includes a refresh light-emitting stage arranged after the post-written-in bias stage, the maintaining frame includes a maintaining light-emitting stage, and the pixel driving method further includes:

at the refresh light-emitting stage and the maintaining light-emitting stage, controlling, by the first light-emission control circuit, a power source voltage end to be electrically connected to the first end of the driving circuit under control of a first light-emission control signal, controlling, by the second light-emission control circuit, the second end of the driving circuit to be electrically connected to a first electrode of the light-emitting element under control of a second light-emission control signal, and driving, by the driving circuit, the light-emitting element.

In at least one embodiment of the present disclosure, the pixel circuit further includes a light-emitting element, a first light-emission control circuit, and a second light-emission control circuit, and the refresh frame further includes a refresh light-emitting stage. The post-written-in bias stage includes a plurality of refresh bias time periods, and the refresh light-emitting stage includes a plurality of refresh light-emitting time periods. The refresh bias time periods and the refresh light-emitting time periods are arranged alternately. The pixel driving method includes:

in the refresh bias time period, writing, by the first initialization circuit, a first initial voltage into the first node under control of the first control signal; writing, by the second initialization circuit, the second initial voltage into the third node under control of the first scanning signal, to enable the driving transistor of the driving circuit to be in the on-bias state;

in the refresh light-emitting time period, controlling, by the first light-emission control circuit, a power source voltage end to be electrically connected to the first end of the driving circuit under control of a first light-emission control signal, controlling, by the second light-emission control circuit, the second end of the driving circuit to be electrically connected to a first electrode of the light-emitting element under control of a second light-emission control signal, and driving, by the driving circuit, the light-emitting element.

Optionally, the compensation control circuit includes a first compensation control transistor and a second compensation control transistor, and the pixel circuit further includes a third initialization circuit. The pixel driving method further includes:

at the refresh light-emitting stage and the maintaining light-emitting stage, writing, by the third initialization circuit, a third initial voltage into an intermediate node under control of a light-emission control signal.

The display device in this embodiment includes the above-mentioned pixel circuit.

The above embodiments are preferred embodiments of the present disclosure, it should be appreciated that those skilled in the art may make various improvements and modifications without departing from the principle of the present disclosure, and theses improvement and modifications shall fall within the scope of the present disclosure.

What is claimed is:

1. A pixel circuit, comprising a driving circuit, a first initialization circuit and a second initialization circuit;

a control end of the driving circuit is electrically connected to a first node, a first end of the driving circuit is electrically connected to a second node, and a second end of the driving circuit is electrically connected to a third node, and the driving circuit is configured to generate a current flowing from the second node to the third node under control of a potential at the first node;

the first initialization circuit is electrically connected to a first control end, a first initial voltage line and the first node, and configured to write a first initial voltage from the first initial voltage line into the first node under control of a first control signal from the first control end;

the second initialization circuit is electrically connected to a first scanning end, a second initial voltage line and the third node, and configured to write a second initial voltage from the second initial voltage line into the third node under control of a first scanning signal from the first scanning end;

wherein the driving circuit comprises a driving transistor which is a p-type transistor, and a difference between a voltage value of the first initial voltage and a voltage value of the second initial voltage is less than a threshold voltage of the driving transistor; or, the driving circuit comprises a driving transistor which is an n-type transistor, and a difference between a voltage value of the first initial voltage and a voltage value of the second initial voltage is greater than a threshold voltage of the driving transistor.

2. The pixel circuit according to claim 1, further comprising a data written-in circuit, a compensation control circuit and an energy storage circuit; wherein, the data written-in circuit is electrically connected to a second scanning end, a data line and the second node, and configured to write a data voltage on the data line into the second node under control of a second scanning signal from the second scanning end;

the compensation control circuit is electrically connected to a second control end, the first node and the third node, and configured to control the first node to be electrically connected to, or electrically disconnected from, the third node under control of a second control signal from the second control end;

a first end of the energy storage circuit is electrically connected to the first node, a second end of the energy storage circuit is electrically connected to a first voltage end, and the energy storage circuit is configured to store electric energy.

3. The pixel circuit according to claim 1, further comprising a data written-in circuit and an energy storage circuit; wherein, the data written-in circuit is electrically connected to a second scanning end, a data line and the first node, and configured to write a data voltage on the data line into the first node under control of a second scanning signal from the second scanning end;

a first end of the energy storage circuit is electrically connected to the first node, a second end of the energy storage circuit is electrically connected to a first voltage end, and the energy storage circuit is configured to store electric energy.

4. The pixel circuit according to claim 1, further comprising a first energy storage circuit, a second energy storage circuit, a data written-in circuit and a compensation control circuit; wherein, a first end of the first energy storage circuit is electrically connected to the first node, a second end of the first energy storage circuit is electrically connected to a first end of the second energy storage circuit, and a second end of the second energy storage circuit is electrically connected to a first voltage end; the first energy storage circuit and the second energy storage circuit are configured to store electric energy;

the data written-in circuit is electrically connected to a second scanning end, a data line and the second end of the first energy storage circuit, and configured to write a data voltage on the data line into the second end of the first energy storage circuit under control of a second scanning signal from the second scanning end;

the compensation control circuit is electrically connected to a second control end, the first node and the third node, and configured to control the first node to be electrically connected to, or electrically disconnected from, the third node under control of a second control signal from the second control end.

5. The pixel circuit according to claim 2, wherein the compensation control circuit comprises a first transistor, a gate electrode of the first transistor is electrically connected to the second control end, a first electrode of the first transistor is electrically connected to the first node, and a second electrode of the first transistor is electrically connected to the third node; the first transistor is a double-gate transistor.

6. The pixel circuit according to claim 2, wherein the compensation control circuit comprises a first compensation control transistor and a second compensation control transistor; a gate electrode of the first compensation control transistor is electrically connected to the second control end, a first electrode of the first compensation control transistor is electrically connected to the first node, and a second electrode of the first compensation control transistor is electrically connected to an intermediate node; a gate electrode of the second compensation control transistor is electrically connected to the second control end, a first electrode of the second compensation control transistor is electrically connected to the intermediate node, and a second electrode of the second compensation control transistor is electrically connected to the third node; the pixel circuit further comprises a third initialization circuit;

the third initialization circuit is electrically connected to a light-emission control end, a third initial voltage line and the intermediate node, and configured to write a third initial voltage from the third initial voltage line into the intermediate node under control of a light-emission control signal from the light-emission control end.

7. The pixel circuit according to claim 1, further comprising a light-emitting element, a first light-emission control circuit and a second light-emission control circuit; wherein, the first light-emission control circuit is electrically connected to a first light-emission control end, a power source voltage end and the first end of the driving circuit, and configured to control the power source voltage end to be electrically connected to, or electrically disconnected from, the first end of the driving circuit under control of a first light-emission control signal from the first light-emission control end;

the second light-emission control circuit is electrically connected to a second light-emission control end, the second end of the driving circuit and a first electrode of the light-emitting element, and configured to control the second end of the driving circuit to be electrically connected to, or electrically disconnected from, the first electrode of the light-emitting element under control of a second light-emission control signal from the second light-emission control end;

a second electrode of the light-emitting element is electrically connected to a second voltage terminal.

8. The pixel circuit according to claim 7, further comprising a fourth initialization circuit;

wherein the fourth initialization circuit is electrically connected to the first scanning end, a fourth initial voltage line and the first electrode of the light-emitting element, and configured to write a fourth initial voltage from the fourth initial voltage line into the first electrode of the light-emitting element under control of the first scanning signal from the first scanning end.

9. The pixel circuit according to claim 1, wherein the driving circuit comprises a driving transistor, the first initialization circuit comprises a second transistor, and the second initialization circuit comprises a third transistor;

a gate electrode of the driving transistor is electrically connected to the first node, a first electrode of the driving transistor is electrically connected to the second node, and a second electrode of the driving transistor is electrically connected to the third node;

a gate electrode of the second transistor is electrically connected to the first control end, a first electrode of the second transistor is electrically connected to the first initial voltage line, and a second electrode of the second transistor is electrically connected to the first node;

a gate electrode of the third transistor is electrically connected to the first scanning end, a first electrode of the third transistor is electrically connected to the second initial voltage line, and a second electrode of the third transistor is electrically connected to the third node.

10. The pixel circuit according to claim 2, wherein the data written-in circuit comprises a fourth transistor;

a gate electrode of the fourth transistor is electrically connected to the second scanning end, a first electrode of the fourth transistor is electrically connected to the data line, and a second electrode of the fourth transistor is electrically connected to the second node;

the energy storage circuit comprises a storage capacitor;

a first end of the storage capacitor is electrically connected to the first node, and a second end of the storage capacitor is electrically connected to a power source voltage end.

11. The pixel circuit according to claim 7, wherein the first light-emission control circuit comprises a fifth transistor, and the second light-emission control circuit comprises a sixth transistor;

a gate electrode of the fifth transistor is electrically connected to the first light-emission control end, a first electrode of the fifth transistor is electrically connected to the power source voltage end, and a second electrode of the fifth transistor is electrically connected to the first end of the driving circuit;

a gate electrode of the sixth transistor is electrically connected to the second light-emission control end, a first electrode of the sixth transistor is electrically connected to the second end of the driving circuit, and a second electrode of the sixth transistor is electrically connected to the first electrode of the light-emitting element.

12. The pixel circuit according to claim 8, wherein the fourth initialization circuit comprises a seventh transistor;

a gate electrode of the seventh transistor is electrically connected to the first scanning end, a first electrode of the seventh transistor is electrically connected to the fourth initial voltage line, and a second electrode of the seventh transistor is electrically connected to the first electrode of the light-emitting element.

13. The pixel circuit according to claim 6, wherein the third comprises an eighth transistor; initialization circuit a gate electrode of the eighth transistor is electrically connected to the light-emission control end, a first electrode of the eighth transistor is electrically connected to the third initial voltage line, and a second electrode of the eighth transistor is electrically connected to the intermediate node.

14. A pixel driving method, applied to the pixel circuit according to claim 1, a display period comprising a maintaining frame, the maintaining frame comprising a maintaining bias stage; the pixel driving method comprises:

at the maintaining bias stage, writing, by the first initialization circuit, a first initial voltage into the first node under control of a first control signal; writing, by the second initialization circuit, a second initial voltage to the third node under control of a first scanning signal, to enable a driving transistor of the driving circuit to be in an on-bias state.

15. The pixel driving method according to claim 14, wherein the pixel circuit further comprises a first light-emission control circuit, a second light-emission control circuit and a light-emitting element;

the maintaining bias stage comprises a plurality of maintaining bias time periods; the maintaining frame further comprises a plurality of maintaining light-emitting time periods; the maintaining bias time periods and the maintaining light-emitting time periods are arranged alternately, and the pixel driving method comprises:

in the maintaining bias time period, writing, by the first initialization circuit, the first initial voltage into the first node under control of the first control signal; writing, by the second initialization circuit, the second initial voltage into the third node under control of the first scanning signal, to enable the driving transistor of the driving circuit to be in the on-bias state;

in the maintaining light-emitting time period, controlling, by the first light-emission control circuit, a power source voltage end to be electrically connected to the first end of the driving circuit under control of a first light-emission control signal, controlling, by the second light-emission control circuit, the second end of the driving circuit to be electrically connected to a first electrode of the light-emitting element under control of a second light-emission control signal, and driving, by the driving circuit, the light-emitting element.

16. The pixel driving method according to claim 14, wherein the display period further comprises a refresh frame arranged between maintaining frames; the refresh frame comprises a pre-written-in bias stage arranged before a data written-in stage; the pixel driving method comprises:

at the pre-written-in bias stage, writing, by the first initialization circuit, the first initial voltage into the first node under control of the first control signal; writing, by the second initialization circuit, the second initial voltage to the third node under control of the first scanning signal, to enable the driving transistor of the driving circuit to be in the on-bias state.

17. The pixel driving method according to claim 14, wherein the display period further comprises a refresh frame arranged between maintaining frames; the refresh frame further comprises a post-written-in bias stage arranged after the data written-in stage; the pixel driving method comprises:

at the post-written-in bias stage, writing, by the first initialization circuit, the first initial voltage into the first node under control of the first control signal; writing, by the second initialization circuit, the second initial voltage into the third node under control of the first scanning signal, to enable the driving transistor of the driving circuit to be in the on-bias state.

18. The pixel driving method according to claim 17, wherein the pixel circuit further comprises a light-emitting element, a first light-emission control circuit and a second light-emission control circuit; the refresh frame further comprises a refresh light-emitting stage;

the post-written-in bias stage comprises a plurality of refresh bias time periods, and the refresh light-emitting stage comprises a plurality of refresh light-emitting time periods; the refresh bias time periods and the refresh light-emitting time periods are arranged alternately;

wherein the pixel driving method comprises:

in the refresh bias time period, writing, by the first initialization circuit, the first initial voltage into the first node under control of the first control signal; writing, by the second initialization circuit, the second initial voltage into the third node under control of the first scanning signal, to enable the driving transistor of the driving circuit to be in the on-bias state;

in the refresh light-emitting time period, controlling, by the first light-emission control circuit, a power source voltage end to be electrically connected to the first end of the driving circuit under control of a first light-emission control signal, controlling, by the second light-emission control circuit, the second end of the driving circuit to be electrically connected to a first electrode of the light-emitting element under control of a second light-emission control signal, and driving, by the driving circuit, the light-emitting element.

19. A display device comprising the pixel circuit according to claim 1.

* * * * *